US012706048B2

(12) United States Patent
Kim et al.

(10) Patent No.: US 12,706,048 B2
(45) Date of Patent: Aug. 11, 2026

(54) DISPLAY DEVICE AND ELECTRONIC DEVICE INCLUDING THE SAME

(71) Applicant: Samsung Display Co., Ltd., Yongin-Si (KR)

(72) Inventors: Sunghwan Kim, Yongin-si (KR); Mihae Kim, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 19/231,968

(22) Filed: Jun. 9, 2025

(65) Prior Publication Data

US 2026/0087984 A1 Mar. 26, 2026

(30) Foreign Application Priority Data

Sep. 23, 2024 (KR) ........................ 10-2024-0128203

(51) Int. Cl.
*G09G 3/3233* (2016.01)

(52) U.S. Cl.
CPC ... *G09G 3/3233* (2013.01); *G09G 2300/0819* (2013.01); *G09G 2320/0257* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 11,769,456 B2 * | 9/2023 | Choe | G09G 3/3275 345/204 |
| 2014/0138644 A1 * | 5/2014 | Park | H10D 86/60 438/34 |
| 2019/0311675 A1 * | 10/2019 | Yang | G09G 3/3233 |
| 2022/0013575 A1 * | 1/2022 | Choi | G09G 3/3233 |
| 2022/0013618 A1 * | 1/2022 | Park | H10K 59/131 |
| 2022/0045158 A1 * | 2/2022 | Na | H10K 59/131 |
| 2023/0025912 A1 * | 1/2023 | Bae | H10K 59/1213 |
| 2023/0027673 A1 * | 1/2023 | Jeong | G09G 3/3266 |
| 2023/0134963 A1 | 5/2023 | Bok | |
| 2023/0141774 A1 * | 5/2023 | Park | H10K 59/131 257/40 |
| 2024/0155902 A1 * | 5/2024 | Li | H10K 59/1315 |
| 2025/0324850 A1 * | 10/2025 | Liu | H10K 59/121 |

FOREIGN PATENT DOCUMENTS

| | | |
|---|---|---|
| KR | 102511048 B1 | 3/2023 |
| KR | 1020230061618 A | 5/2023 |
| KR | 1020230119738 A | 8/2023 |

* cited by examiner

*Primary Examiner* — Sepehr Azari
(74) *Attorney, Agent, or Firm* — Innovation Counsel LLP

(57) ABSTRACT

Provided is a display device including a light emitting element, a first transistor including a first electrode, a second electrode connected to an anode of the light emitting element, and a control electrode connected to a first node, a second transistor including a first electrode connected to a data line, a second electrode connected to the first electrode of the first transistor, and a control electrode connected to a write scan line, a fifth transistor including a first electrode connected to a first power line, a second electrode connected to the first electrode of the first transistor, and a control electrode connected to an emission line, and a doped region including a semiconductor doped with a dopant, disposed below a portion of the emission line, and overlapping the emission line in a plan view.

20 Claims, 21 Drawing Sheets

DISPLAY DEVICE AND ELECTRONIC DEVICE INCLUDING THE SAME

CROSS-REFERENCE TO RELATED APPLICATIONS

This U.S. non-provisional patent application claims priority under 35 U.S.C. § 119 to Korean Patent Application No. 10-2024-0128203, filed on Sep. 23, 2024, the entire contents of which are hereby incorporated by reference.

BACKGROUND

The present disclosure herein relates to a display device and an electronic device including the same.

In general, electronic devices such as smartphones, digital cameras, notebook computers, navigation devices and smart televisions which provide images for users include display devices for displaying the images. The display devices generate the images and provide the users with the generated images through display screens.

A display device includes a display panel for generating an image and the display panel includes a plurality of pixels. The pixels receive scan signals, emission signals, and data voltages and are driven to generate the image. Each of the pixels includes a plurality of transistors and a light emitting element driven by the transistors. The light emitting element is driven by the transistors and generates light having a certain luminance.

The display device having high resolution is required to improve quality of the image. As the resolution is increased, the number of the pixels is increased. As the number of the pixels is increased, a disposition area for disposing the transistors is decreased. Thus, technical development is required to efficiently dispose the transistors within a limited area.

SUMMARY

The present disclosure provides a display device including pixel circuits having a reduced area to implement high resolution, and an electronic device including the display device.

An embodiment of the inventive concept provides a display device including a light emitting element, a first transistor including a first electrode, a second electrode connected to an anode of the light emitting element, and a control electrode connected to a first node, a second transistor including a first electrode connected to a data line, a second electrode connected to the first electrode of the first transistor, and a control electrode connected to a write scan line, a fifth transistor including a first electrode connected to a first power line, a second electrode connected to the first electrode of the first transistor, and a control electrode connected to an emission line, and a doped region including a semiconductor doped with a dopant, disposed below a portion of the emission line, and overlapping the emission line in a plan view.

In an embodiment of the inventive concept, a display device includes a light emitting element, a first transistor including a first electrode, a second electrode connected to an anode of the light emitting element, and a control electrode connected to a first node, a second transistor including a first electrode connected to a data line, a second electrode connected to the first electrode of the first transistor, and a control electrode connected to a write scan line, a fifth transistor including a first electrode connected to a first power line, a second electrode connected to the first electrode of the first transistor, and a control electrode connected to an emission line, and a doped region including a semiconductor doped with a dopant, disposed below a portion of the emission line, and overlapping the emission line in a plan view, wherein the emission line is disposed on the same layer as the control electrode of the fifth transistor.

In an embodiment of the inventive concept, an electronic device includes a processor, and a display device receiving image data from the processor and configured to display an image corresponding to the image data. The display device may include a light emitting element, a first transistor including a first electrode, a second electrode connected to an anode of the light emitting element, and a control electrode connected to a first node, a second transistor including a first electrode connected to a data line, a second electrode connected to the first electrode of the first transistor, and a control electrode connected to a write scan line, a fifth transistor including a first electrode connected to a first power line, a second electrode connected to the first electrode of the first transistor, and a control electrode connected to an emission line, and a doped region including a semiconductor doped with a dopant, disposed below a portion of the emission line, and overlapping the emission line in a plan view.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings:

FIGS. 8A to 8H;

DETAILED DESCRIPTION

Figure 1:
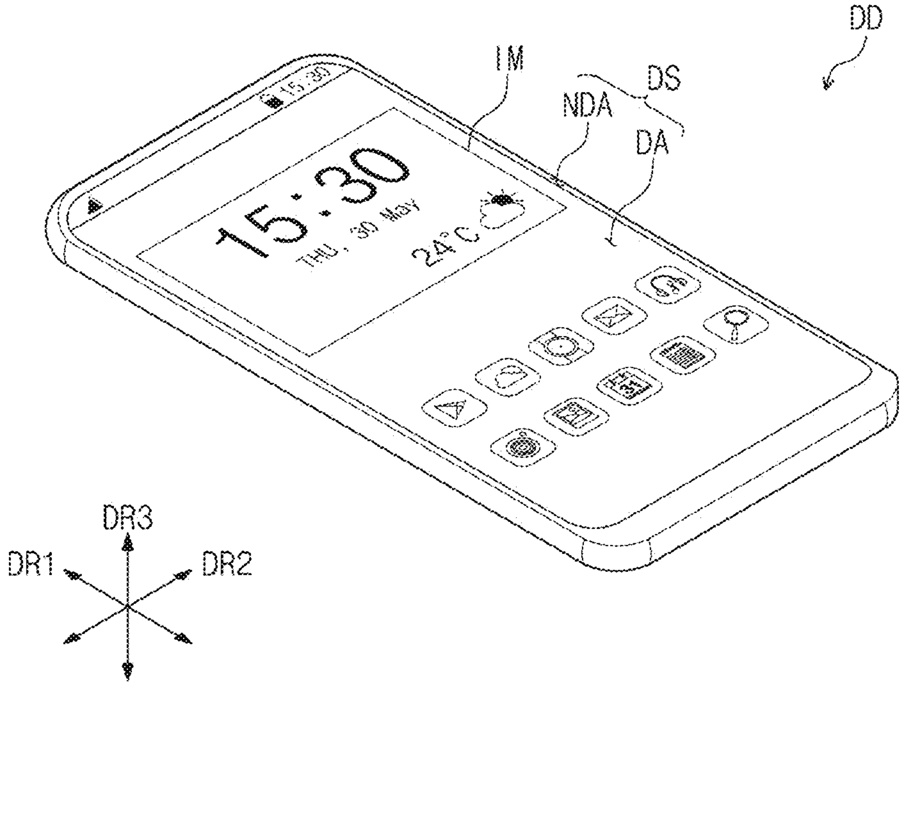
FIG. 1 is a perspective view of a display device according to an embodiment of the inventive concept.

In the present disclosure, it will be understood that when an element (or region, layer, section, etc.) is referred to as being "on", "connected to" or "coupled to" another element, it can be disposed directly on, connected or coupled to the other element or a third intervening elements may be disposed between the elements.

Like reference numerals or symbols refer to like elements throughout. In addition, in the drawings, the thickness, the ratio, and the dimension of elements are exaggerated for effective description of the technical contents.

The term "and/or" includes one or more combinations which may be defined by relevant elements.

It will be understood that, although the terms first, second, etc. may be used herein to describe various elements, these elements should not be limited by these terms. These terms are only used to distinguish one element from another element. For example, a first element could be termed a second element without departing from the teachings of the present invention, and similarly, a second element could be termed a first element. As used herein, the singular forms are intended to include the plural forms as well, unless the context clearly indicates otherwise.

In addition, the terms, such as "below", "beneath", "on" and "above", are used for explaining the relation of elements shown in the drawings. The terms are relative concepts and are explained based on the direction shown in the drawing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms such as "includes" or "has", when used herein, specify the presence of stated features, numerals, steps, operations, elements, parts, or the combination thereof, but do not preclude the presence or addition of one or more other features, numerals, steps, operations, elements, parts, or the combination thereof.

Hereinafter, embodiments of the inventive concept will be described with reference to the accompanying drawings.

FIG. 1 is a perspective view of a display device according to an embodiment of the inventive concept.

Referring to FIG. 1, a display device DD according to an embodiment of the inventive concept may have long sides extending in a first direction DR1 and have short sides extending in a second direction DR2 crossing the first direction DR1. A corner of the display device DD may have a rounded shape. The shape of the display device DD in FIG. 1 is illustrated as an example, and the shape of the display device DD is not limited to the shape illustrated in FIG. 1.

Hereinafter, a direction extending substantially perpendicular to a plane defined by the first direction DR1 and the second direction DR2 is defined as a third direction DR3. The state "in a plan view" used herein is defined as a state when viewed in the third direction DR3.

A front surface of the display device DD may be defined as a display surface DS and may have a plane defined by the first direction DR1 and the second direction DR2. Images IM generated in the display device DD may be provided for a user through the display surface DS.

The display surface DS may include a display area DA and a non-display area NDA around the display area DA. The display area DA may display an image and the non-display area NDA may not display an image. The non-display area NDA may surround the display area DA and define an edge of the display device DD which is printed in a certain color.

A mobile phone is illustrated as an example of the display device DD. However, the display device DD is not limited thereto and may be used for various electronic devices. For example, the display device DD may be used for a large-sized electronic devices such as televisions, monitors, or outdoor billboards. In addition, the display device DD may be used for small and medium-sized electronic devices such as personal computers, notebook computers, vehicle navigation devices, game consoles, tablet computers, or cameras.

Figure 2:
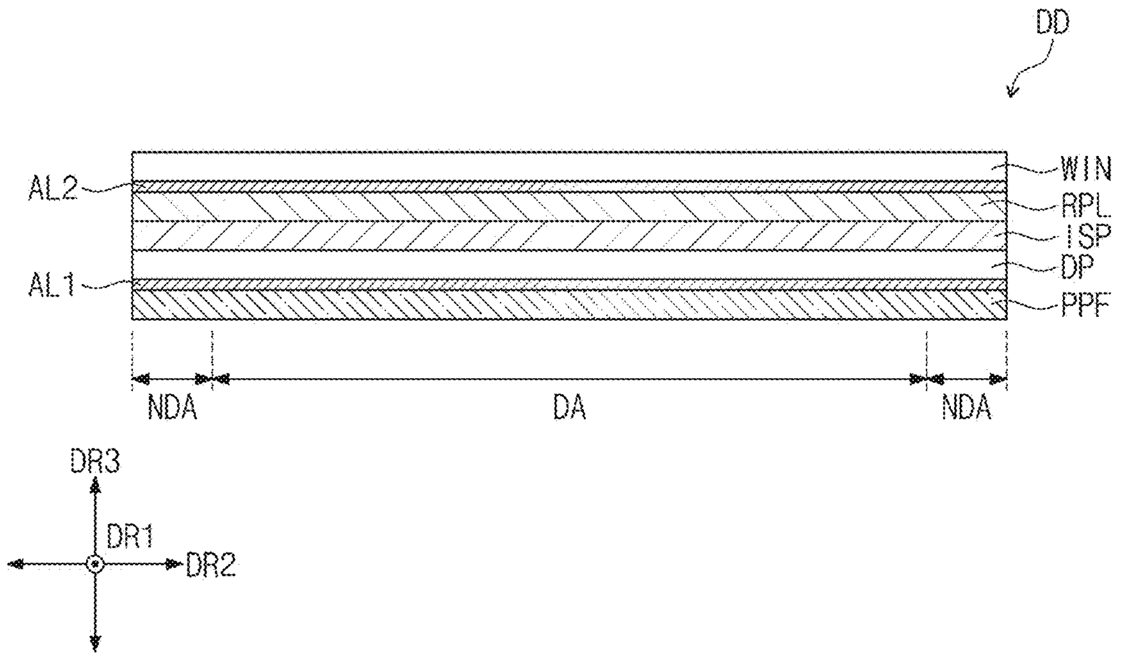
FIG. 2 is a view illustrating an example of a cross-section of the display device illustrated in FIG. 1.

FIG. 2 is a view illustrating an example of a cross-section of the display device illustrated in FIG. 1.

As an example, FIG. 2 illustrates a cross-section of a display device DD when viewed in the first direction DR1.

Referring to FIG. 2, the display device DD may include a display panel DP, an input sensing part ISP, an anti-reflective layer RPL, a window WIN, a panel protective film PPF, and first and second adhesive layers AL1 and AL2.

The display panel DP according to an embodiment of the inventive concept may be an emissive display panel. For example, the display panel DP may be an organic light emitting display panel or an inorganic light emitting display panel. An emission layer of the organic light emitting display panel may include an organic light emitting material. An emission layer of the inorganic light emitting display panel may include a quantum dot, a quantum rod, and the like. Hereinafter, the display panel DP is described as the organic light emitting display panel.

The input sensing part ISP may be disposed on the display panel DP. The input sensing part ISP may include a plurality of sensors (not illustrated) for sensing an external input by using a capacitance method. The input sensing part ISP may be directly manufactured on the display panel DP during manufacture of the display device DD. However, an embodiment of the inventive concept is not limited thereto and the input sensing part ISP may be manufactured as a separate panel from the display panel DP to be attached to the display panel DP through an adhesive layer.

The anti-reflective layer RPL may be disposed on the input sensing part ISP. The anti-reflective layer RPL may be directly manufactured on the input sensing part ISP during the manufacture of the display device DD. However, an embodiment of the inventive concept is not limited thereto and the anti-reflective layer RPL may be manufactured as a separate panel to be attached to the input sensing part ISP through an adhesive layer.

The anti-reflective layer RPL may be defined as a film that prevents reflection of external light. The anti-reflective layer RPL may reduce the reflectance of external light incident from above the display device DD toward the display panel DP. The external light may not be visible to a user due to the anti-reflective layer RPL.

When external light traveling toward the display panel DP is reflected by the display panel DP and provided to an external user again, the external light may be visible to the user. To prevent this phenomenon, the anti-reflective layer RPL may include, for example, a plurality of color filters that display the same colors as pixels of the display panel DP.

The color filters may filter the external light to have the same colors as those of the pixels. In this case, the external light may not be visible to the user. However, an embodiment of the inventive concept is not limited thereto and the anti-reflective layer RPL may include a retarder and/or a polarizer in order to reduce the reflectance of the external light.

The window WIN may be disposed on the anti-reflective layer RPL. The window WIN may protect the display panel DP, the input sensing part ISP, and the anti-reflective layer RPL from external scratches and impacts.

The panel protective film PPF may be disposed below the display panel DP. The panel protective layer PPF may protect a lower portion of the display panel DP. The panel protective film PPF may include a flexible plastic material such as polyethylene terephthalate (PET).

The first adhesive layer AL1 may be disposed between the display panel DP and the panel protective film PPF, and the display panel DP and the panel protective layer film may be bonded to each other through the first adhesive layer AL1. The second adhesive layer AL2 may be disposed between the window WIN and the anti-reflective layer RPL, and the window WIN and the anti-reflective layer RPL may be bonded to each other through the second adhesive layer AL2.

Figure 3:
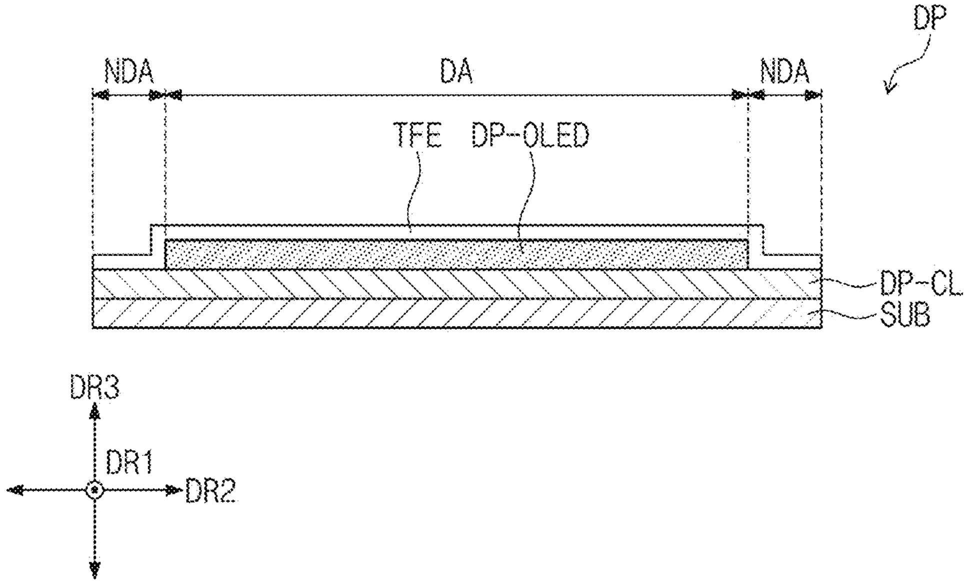
FIG. 3 is a view illustrating an example of a cross-section of a display panel illustrated in FIG. 2.

FIG. 3 is a view illustrating an example of a cross-section of the display panel illustrated in FIG. 2.

As an example, FIG. 3 illustrates a cross-section of a display panel DP when viewed in the first direction DR1.

Referring to FIG. 3, the display panel DP may include a substrate SUB, a circuit element layer DP-CL disposed on the substrate SUB, a display element layer DP-OLED disposed on the circuit element layer DP-CL, and a thin-film encapsulation layer TFE disposed on the display element layer DP-OLED.

The substrate SUB may include a display area DA and a non-display area NDA around the display area DA. The substrate SUB may include glass, or include a flexible plastic material such as polyimide (PI). The display element layer DP-OLED may be disposed on the display area DA.

A plurality of pixels may be disposed in the circuit element layer DP-CL and the display element layer DP-OLED. Each of the pixels may include a transistor disposed in the circuit element layer DP-CL and a light emitting element disposed in the display element layer DP-OLED and connected to the transistor.

The thin-film encapsulation layer TFE may be disposed on the circuit element layer DP-CL so as to cover the display element layer DP-OLED. The thin-film encapsulation layer TFE may protect the pixels from moisture, oxygen, and external foreign matter.

Figure 4:
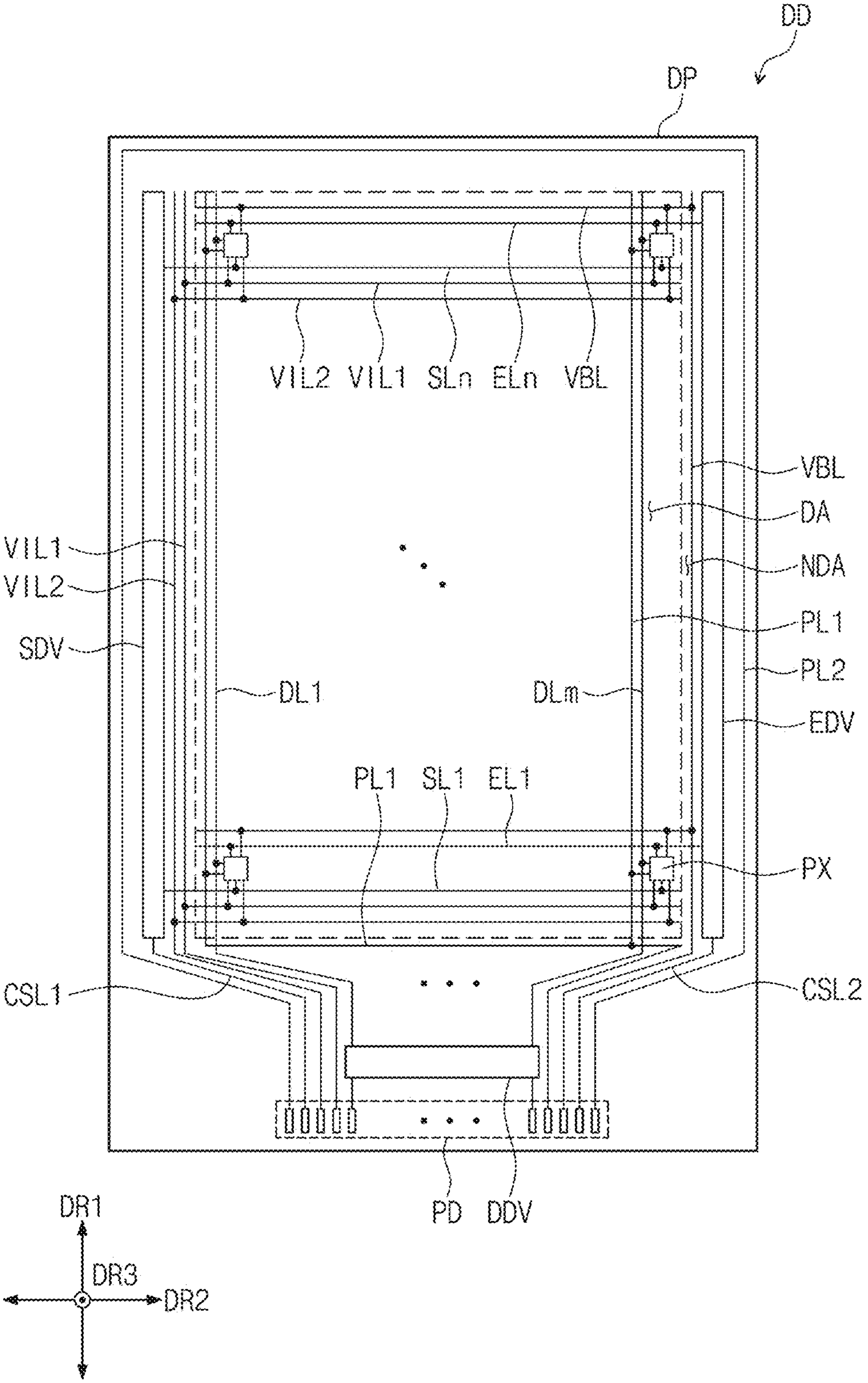
FIG. 4 is a plan view of the display panel illustrated in FIG. 2.

FIG. 4 is a plan view of the display panel illustrated in FIG. 2.

Referring to FIG. 4, a display device DD may include a display panel DP, a scan driver SDV, a data driver DDV, a light emission driver EDV, and a plurality of pads PD.

The display panel DP may have a rectangular shape having long sides extending in the first direction DR1 and short sides extending in the second direction DR2, but the shape of the display panel DP is not limited thereto. The display panel DP may include a display area DA, and a non-display area NDA surrounding the display area DA.

The display panel DP may include a plurality of pixels PX, a plurality of scan lines SL1 to SLn, a plurality of data lines DL1 to DLm, a plurality of emission lines EL1 to ELn, first and second control lines CSL1 and CSL2, first and second power lines PL1 and PL2, first and second initialization lines VIL1 and VIL2, and a bias line VBL. Here, m and n are each a natural number. The pixels PX may be disposed in the display area DA.

The scan driver SDV and the light emission driver EDV may be disposed in the non-display area NDA. The scan driver SDV and the light emission driver EDV may be respectively disposed in the non-display areas NDA adjacent to both sides of the display panel DP which are opposite to each other in the second direction DR2.

The data driver DDV may be disposed in the non-display area NDA. The data driver DDV may be disposed in the non-display area NDA adjacent to one of the short sides of the display panel DP. The data driver DDV may be adjacent to a lower end of the display panel DP in a plan view. The data driver DDV may be manufactured in the form of an integrated circuit chip to be mounted on the non-display area NDA.

The pads PD may be disposed in the non-display area NDA adjacent to the lower end of the display panel DP. The pads PD may be more adjacent to the lower end of the display panel DP than the data driver DDV is.

The scan lines SL1 to SLn may extend in the second direction DR2 and be connected to the pixels PX and the scan driver SDV. The emission lines EL1 to ELn may extend in the second direction DR2 and be connected to the pixels PX and the light emission driver EDV.

The data lines DL1 to DLm may extend in the first direction DR1 in the display area DA and be connected to the pixels PX. The data lines DL1 to DLm may be bent at a boundary between the display area DA and the non-display area NDA in which the data driver DDV is disposed, and extend to the non-display area NDA. The data lines DL1 to DLm may extend toward the data driver DDV in the non-display area NDA and be connected to the data driver DDV. The data driver DDV may be connected to data line pads disposed at ends of the data lines DL1 to DLn.

The first power line PL1 may be connected to a corresponding pad PD of the pads PD and extend to the non-display area NDA adjacent to a lower side of the display area DA. The first power line PL1 may extend in the second direction DR2 in the non-display area NDA adjacent to the lower side of the display area DA. Thus, the first power line PL1 extending in the second direction DR2 may be disposed between the data driver DDV and the display area DA.

The first power line PL1 may be branched into a plurality of first power lines PL1 to extend into the display area DA. The plurality of branched first power lines PL1 may extend in the first direction DR1 to be connected to the pixels PX within the display area DA. A first voltage may be applied to the pixels PX through the first power line PL1.

The second power line PL2 may be disposed in the non-display area NDA and extend along the long sides of the display panel DP and the other (e.g., an upper end of the display panel) of the short sides of the display panel DP. The second power line PL2 may surround the scan driver SDV and the light emission driver EDV. The second power line PL2 may be connected to corresponding pads PD of the pads PD.

Although not illustrated, the second power line PL2 may extend toward the display area DA and be connected to the pixels PX. A second voltage having a lower level than the first voltage may be applied to the pixels PX through the second power line PL2.

The first initialization line VIL1 and the second initialization line VIL2 may extend in the first direction DR1 in the non-display area NDA. In the non-display area NDA, the first initialization line VIL1 and the second initialization line VIL2 may be disposed between the display area DA and the scan driver SDV.

Each of the first initialization line VIL1 and the second initialization line VIL2 may be branched into a plurality of lines to extend into the display area DA. The plurality of branched first initialization lines VIL1 may extend in the second direction DR2 to be connected to the pixels PX within the display area DA. The plurality of branched second initialization lines VIL2 may extend in the second direction DR2 to be connected to the pixels PX within the display area DA. The first and second initialization lines VIL1 and VIL2 may be connected to corresponding pads PD of the pads PD.

A first initialization voltage may be applied to the pixels PX through the first initialization line VIL1. A second initialization voltage may be applied to the pixels PX through the second initialization line VIL2.

The bias line VBL may extend in the first direction DR1 in the non-display area NDA. In the non-display area NDA, the bias line VBL may be disposed between the display area DA and the light emission driver EDV.

The bias line VBL may be branched into a plurality of bias lines VBL to extend into the display area DA. The plurality of branched bias lines VBL may extend in the second direction DR2 to be connected to the pixels PX within the display area DA. The bias line VBL may be connected to a corresponding pad PD of the pads PD. A bias voltage may be applied to the pixels PX through the bias line VBL.

The first control line CSL1 may be connected to the scan driver SDV and extend toward the lower end of the display panel DP. The second control line CSL2 may be connected to the light emission driver EDV and extend toward the lower end of the display panel DP. The first and second control lines CSL1 and CSL2 may be connected to corresponding pads PD of the pads PD.

Although not illustrated, a timing controller (or a timing control circuit) for controlling an operation of each of the scan driver SDV, the data driver DDV, and the light emission driver EDV may be connected to the pads PD through a printed circuit board.

The scan driver SDV may generate a plurality of scan signals, and the scan signals may be applied to the pixels PX through the scan lines SL1 to SLn. The data driver DDV may generate a plurality of data voltages, and the data voltages may be applied to the pixels PX through the data lines DL1 to DLm. The light emission driver EDV may generate a plurality of emission signals, and the emission signals may be applied to the pixels PX through the emission lines EL1 to ELn.

The pixels PX may receive the data voltages in response to the scan signals. The pixels PX may display an image by emitting light with luminance corresponding to the data voltages in response to the emission signals.

Figure 5:
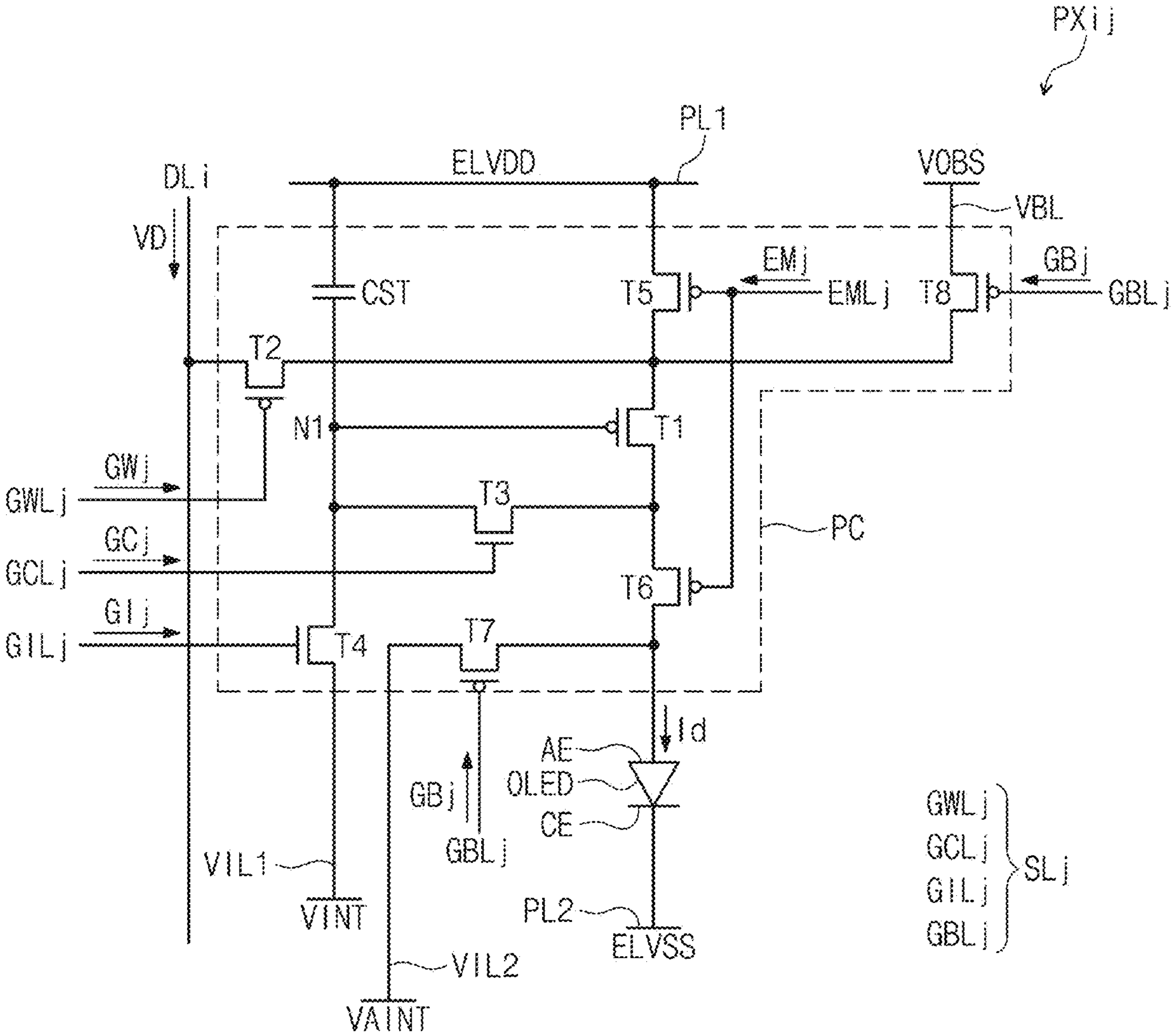
FIG. 5 is a view illustrating an equivalent circuit of one of pixels illustrated in FIG. 4.

FIG. 5 is a view illustrating an equivalent circuit of one of the pixels illustrated in FIG. 4.

As an example, FIG. 5 illustrates a pixel PXij connected to an i-th data line DLi, a j-th scan line SLj, and a j-th emission line EMLj. Here, i and j may each be a natural number.

Referring to FIG. 5, the pixel PXij may include a pixel circuit PC and a light emitting element OLED connected to the pixel circuit PC. The pixel circuit PC may drive the light emitting element OLED.

The pixel circuit PC may include a plurality of transistors T1 to T8 and a capacitor CST. The transistors T1 to T8 and the capacitor CST may control an amount of current flowing through the light emitting element OLED. The light emitting element OLED may generate light having a certain luminance according to an amount of received current.

The j-th scan line SLj may include a j-th write scan line GWLj, a j-th compensation scan line GCLj, a j-th initialization scan line GILj, and a j-th bias scan line GBLj.

The j-th write scan line GWLj may receive a j-th write scan signal GWj, and the j-th compensation scan line GCLj may receive a j-th compensation scan signal GCj. The j-th initialization scan line GILj may receive a j-th initialization scan signal GIj, and the j-th bias scan line GBLj may receive a j-th bias scan signal GBj. The j-th emission line EMLj may receive a j-th emission signal EMj.

The pixel PXij may be connected to the i-th data line DLi, the j-th write scan line GWLj, the j-th compensation scan line GCLj, the j-th initialization scan line GILj, the j-th bias scan line GBLj, the j-th emission line EMLj, a first initialization line VIL1, a second initialization line VIL2, a bias line VBL, and first and second power lines PL1 and PL2.

A first initialization voltage VINT may be applied to the first initialization line VIL1, and a second initialization voltage VAINT may be applied to the second initialization line VIL2. A bias voltage VOBS may be applied to the bias line VBL. A first voltage ELVDD may be applied to the first power line PL1, and a second voltage ELVSS may be applied to the second power line PL2.

Each of the transistors T1 to T8 may include a source electrode, a drain electrode, and a gate electrode. Hereinafter, for convenience, in FIG. 5, one of the source electrode and the drain electrode is defined as a first electrode, and the other is defined as a second electrode.

The transistors T1 to T8 may include first to eighth transistors T1 to T8. The first, second, and fifth to eighth transistors T1, T2 and T5 to T8 may be PMOS transistors. The third and fourth transistors T3 and T4 may be NMOS transistors.

The first transistor T1 may be defined as a driving transistor, and the second transistor T2 may be defined as a switching transistor. The third transistor T3 may be defined as a compensation transistor. The fourth transistor T4 and the seventh transistor T7 may be defined as initialization transistors. The fifth transistor T5 and the sixth transistor T6 may be defined as emission control transistors. The eighth transistor T8 may be defined as a bias transistor.

The light emitting element OLED may be an organic light emitting element. The light emitting element OLED may include an anode AE and a cathode CE. The anode AE may receive the first voltage ELVDD through the fifth, first, and sixth transistors T5, T1 and T6. The first voltage ELVDD may be applied to the pixel circuit PC through the first power line PL1.

The cathode CE may receive the second voltage ELVSS having a lower level than the first voltage ELVDD. The second voltage ELVSS may be applied to the light emitting element OLED through the second power line PL2.

The first transistor T1 may be disposed between the fifth transistor T5 and the sixth transistor T6 to be connected to the fifth transistor T5 and the sixth transistor T6. The first transistor T1 may be connected to the first power line PL1 through the fifth transistor T5 and be connected to the anode AE of the light emitting element OLED through the sixth transistor T6.

The first transistor T1 may include a first electrode connected to the first power line PL1 through the fifth transistor T5, a second electrode connected to the anode AE through the sixth transistor T6, and a control electrode connected to a first node N1.

The first electrode of the first transistor T1 may be connected to the fifth transistor T5 and the second electrode of the first transistor T1 may be connected to the sixth transistor T6. The first transistor T1 may control an amount of current flowing through the light emitting element OLED according to a voltage of the first node N1 which is applied to the control electrode of the first transistor T1.

The second transistor T2 may be connected between the first transistor T1 and the i-th data line DLi, and be switched in response to the j-th write scan line GWLj. The second transistor T2 may include a first electrode connected to the i-th data line DLi, a second electrode connected to the first electrode of the first transistor T1, and a control electrode connected to the j-th write scan line GWLj.

The second transistor T2 may be turned on in response to the j-th write scan signal GWj received through the j-th write scan line GWLj and electrically connect the i-th data line DLi to the first electrode of the first transistor T1. The second transistor T2 may perform a switching operation of providing a data voltage VD received through the i-th data line DLi to the first electrode of the first transistor T1.

The third transistor T3 may be connected between the first node N1 and the second electrode of the first transistor T1, and be switched in response to the j-th compensation scan signal GCj. The third transistor T3 may be connected to the control electrode of the first transistor T1 through the first node T1. The third transistor T3 may include a first electrode connected to the second electrode of the first transistor T1, a second electrode connected to the first node N1, and a control electrode connected to the j-th compensation scan line GCLj.

The third transistor T3 may be turned on in response to the j-th compensation scan signal GCj received through the j-th compensation scan line GCLj, and electrically connect the second electrode of the first transistor T1 to the control electrode of the first transistor T1. When the third transistor T3 is turned on, the first transistor T1 may be diode-connected.

The fourth transistor T4 may be connected between the first initialization line VIL1 and the first node N1, and be switched in response to the j-th initialization scan signal GIj. The fourth transistor T4 may be connected to the control electrode of the first transistor T1 through the first node T1. The fourth transistor T4 may include a first electrode connected to the first node N1, a second electrode connected to the first initialization line VIL1, and a control electrode connected to the j-th initialization scan line GILj.

The fourth transistor T4 may be turned on in response to the j-th initialization scan signal GIj received through the j-th initialization scan line GILj, and provide the first initialization voltage VINT received through the first initialization line VIL1 to the first node N1.

The fifth transistor T5 may be connected between the first power line PL1 and the first electrode of the first transistor T1, and be switched in response to the j-th emission signal EMj. The fifth transistor T5 may include a first electrode connected to the first power line PL1, a second electrode connected to the first electrode of the first transistor T1, and a control electrode connected to the j-th emission line EMLj.

The sixth transistor T6 may be connected between the second electrode of the first transistor T1 and the anode AE of the light emitting element OLED, and be switched in response to the j-th emission signal EMj. The sixth transistor T6 may include a first electrode connected to the second electrode of the first transistor T1, a second electrode connected to the anode AE, and a control electrode connected to the j-th emission line EMLj.

The fifth transistor T5 and the sixth transistor T6 may be turned on in response to the j-th emission signal EMj received through the j-th emission line EMLj. The first voltage ELVDD may be provided to the light emitting element OLED by the turned-on fifth transistor T5 and sixth transistor T6 so that driving current flows through the light emitting element OLED. Accordingly, the light emitting element OLED may emit light.

The seventh transistor T7 may be connected between the anode AE of the light emitting element OLED and the second initialization line VIL2, and be switched in response to the j-th bias scan signal GBj. The seventh transistor T7 may include a first electrode connected to the anode AE, a second electrode connected to the second initialization line VIL2, and a control electrode connected to the j-th bias scan line GBLj.

The seventh transistor T7 may be turned on in response to the j-th bias scan signal GBj received through the j-th bias scan line GBLj, and provide the second initialization voltage VAINT received through the second initialization line VIL2 to the anode AE of the light emitting element OLED.

In an embodiment of the inventive concept, the seventh transistor T7 may be omitted. In an embodiment of the inventive concept, the second initialization voltage VAINT may have a different level from the first initialization voltage VINT, but the second initialization voltage VAINT is not limited thereto and may have the same level as the first initialization voltage VINT.

The seventh transistor T7 may improve black display performance of the pixel PXij. When the seventh transistor T7 is turned on, a parasitic capacitor (not illustrated) of the light emitting element OLED may be discharged. Thus, when a black luminance is realized, the light emitting element OLED may not emit light due to leakage current from the first transistor T1, and accordingly, the black display performance may be improved.

The eighth transistor T8 may be connected between the first electrode of the first transistor T1 and the bias line VBL, and be switched in response to the j-th bias scan signal GBj. The eighth transistor T8 may include a first electrode connected to the bias line VBL, a second electrode connected to the first electrode of the first transistor T1, and a control electrode connected to the j-th bias scan line GBLj.

The eighth transistor T8 may be turned on in response to the j-th bias scan signal GBj and provide the bias voltage VOBS received through the bias line VBL to the first electrode of the first transistor T1.

The capacitor CST may include a first electrode connected to the first power line PL1, and a second electrode connected to the control electrode of the first transistor T1 through the first node N1. When the fifth transistor T5 and the sixth transistor T6 are turned on, an amount of current flowing through the first transistor T1 may be determined according to a voltage stored in the capacitor CST.

Figure 6:
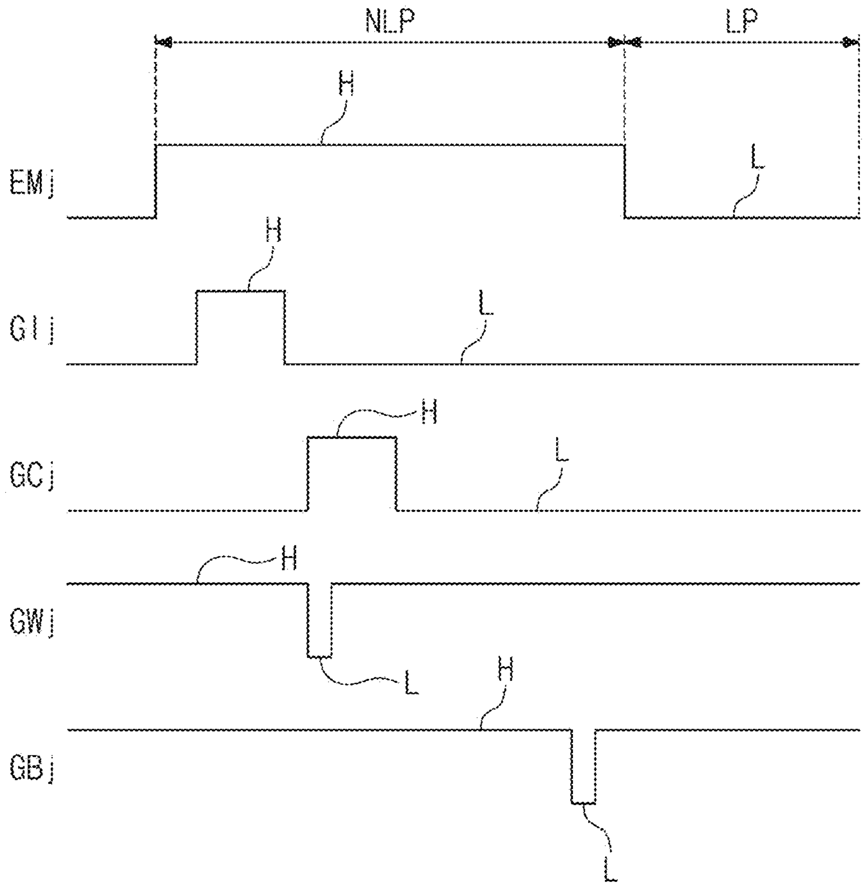
FIG. 6 is a timing diagram of scan signals and emission signals for describing an operation of the pixel illustrated in FIG. 5.

FIG. 6 is a timing diagram of scan signals and emission signals for describing an operation of the pixel illustrated in FIG. 5.

Referring to FIGS. 5 and 6, the j-th emission signal EMj may have a high level H for a non-emission period NLP, and have a low level L for an emission period LP. An active period of the j-th emission signal EMj may be defined as the low level L.

Active periods of the j-th write scan signal GWj and the j-th bias scan signal GBj may be defined as low levels L of the j-th write scan signal GWj and the j-th bias scan signal GBj, respectively.

Active periods of the j-th compensation scan signal GCj and the j-th initialization scan signal GIj may be defined as high levels H of the j-th compensation scan signal GCj and the j-th initialization scan signal GIj, respectively.

The j-th initialization scan signal GIj may be activated, and then the j-th compensation scan signal GCj and the j-th write scan signal GWj may be activated. Thereafter, the j-th bias scan signal GBj may be activated.

During the non-emission period NLP, the activated j-th initialization scan signal GIj, j-th compensation scan signal GCj, j-th write scan signal GWj, and j-th bias scan signal GBj may be applied to the pixel PXij.

The j-th initialization scan signal GIj may be applied to the fourth transistor T4 to turn on the fourth transistor T4. The first initialization voltage VINT may be provided to the first node N1 through the fourth transistor T4. Thus, the first initialization voltage VINT may be applied to the control electrode of the first transistor T1, and the first transistor T1 may be initialized by the first initialization voltage VINT. This operation may be defined as an initialization operation.

The j-th write scan signal GWj may be applied to the second transistor T2 to turn on the second transistor T2. In addition, the j-th compensation scan signal GCj may be applied to the third transistor T3 to turn on the third transistor T3.

The first transistor T1 may be diode-connected. In this case, a compensation voltage Vd−Vth which is reduced from the data voltage VD by a threshold voltage Vth of the first transistor T1 may be applied to the control electrode of the first transistor T1. This operation may be defined as a write operation (or a programing operation) and a compensation operation (or a threshold voltage compensation operation).

The first voltage ELVDD and the compensation voltage Vd−Vth may be applied to the first electrode and the second electrode of the capacitor CST, respectively. The capacitor CST may store a charge corresponding to a difference between a voltage of the first electrode of the capacitor CST and the second electrode of the capacitor CST.

Thereafter, the j-th bias scan signal GBj may be applied to the seventh and eighth transistors T7 and T8 to turn on the seventh and eighth transistors T7 and T8. The second initialization voltage VAINT may be provided to the anode AE through the seventh transistor T7, and the anode AE may be initialized by the second initialization voltage VAINT. The bias voltage VOBS may be applied to the first electrode of the first transistor T1 through the eighth transistor T8.

Thereafter, during the emission period LP, the j-th emission signal EMj may be applied to the fifth transistor T5 and the sixth transistor T6 through the j-th emission line EMLj to turn on the fifth transistor T5 and the sixth transistor T6. In this case, a driving current Id corresponding to a difference between a voltage of the control electrode of the first transistor T1 and a voltage of the first voltage ELVDD may be generated. The driving current Id may be provided to the light emitting element OLED through the sixth transistor T6 so that the light emitting element OLED emits light.

During the emission period LP, a gate-source voltage Vgs of the first transistor T1 may be defined as Vgs=ELVDD−(Vd−Vth) by the capacitor CST. An equation of a relationship between a current and a voltage of the first transistor T1 may be defined as $Id=(1/2)\mu Cox(W/L)(Vgs-Vth)^2$. This equation is a current-voltage relationship equation of a general transistor.

When Vgs is substituted into the current-voltage relationship equation, the threshold voltage Vth may be removed, and the driving current Id may be proportional to $(ELVDD-Vd)^2$ which is a square of the data voltage VD subtracted from the first voltage ELVDD. Thus, the driving current Id may be determined regardless of the threshold voltage Vth of the first transistor T1.

The bias voltage VOBS may be applied to the first electrode of the first transistor T1 through the eighth transistor T8 after the threshold voltage of the first transistor T1 is compensated and before the light emitting element OLED emits light. A shift of a hysteresis loop of the first transistor T1 may be suppressed by the bias voltage VOBS. This operation may be defined as a bias operation.

Figure 7:
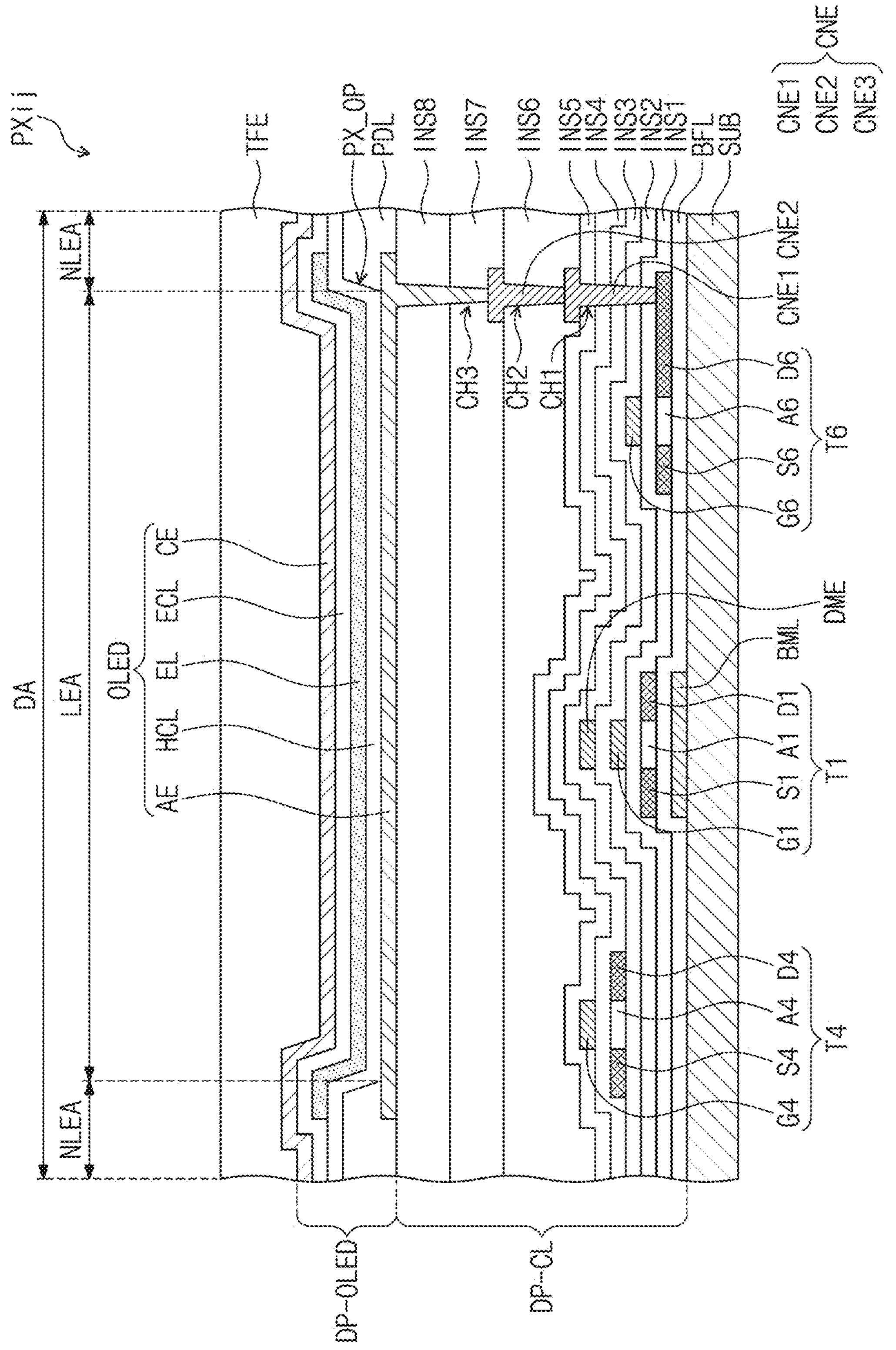
FIG. 7 is a view illustrating an example of a cross-section of a light emitting element, a first transistor, a fourth transistor, and a sixth transistor of the pixel illustrated in FIG. 5.

FIG. 7 is a view illustrating an example of a cross-section of a light emitting element, a first transistor, a fourth transistor, and a sixth transistor of the pixel illustrated in FIG. 5.

Referring to FIG. 7, a light emitting element OLED may include a first electrode AE, a second electrode CE, a hole control layer HCL, an electron control layer ECL, and an emission layer EL. The first electrode AE may be the anode AE illustrated in FIG. 5, and the second electrode CE may be the cathode CE illustrated in FIG. 5. The second electrode CE may be disposed on the first electrode AE, and the hole control layer HCL, the electron control layer ECL, and the emission layer EL may be disposed between the first electrode AE and the second electrode CE.

First, fourth, and sixth transistors T1, T4 and T6 and the light emitting element OLED may be disposed on a substrate SUB. A display area DA may include an emission area LEA corresponding to a pixel PXij, and a non-emission area NLEA adjacent to the emission area LEA. The light emitting element OLED may be disposed in the emission area LEA.

A lower metal layer BML may be disposed on the substrate SUB. The lower metal layer BML may overlap the first transistor T1. Although not illustrated, the lower metal layer BML may receive a constant voltage. When the constant voltage is applied to the lower metal layer BML, a value of a threshold voltage Vth of the first transistor T1 disposed on the lower metal layer BML may be maintained without changing.

In addition, the lower metal layer BML may block light incident on the first transistor T1 from below the lower metal layer BML. For example, the lower metal layer BML may include a reflective metal. The lower metal layer BML may be omitted.

A buffer layer BFL may be disposed on the substrate SUB, and the buffer layer BFL may be an inorganic layer. The buffer layer BFL may cover the lower metal layer BML. First semiconductor layers S1, A1 and D1 of the first transistor T1 and sixth semiconductor layers S6, A6 and D6 of the sixth transistor T6 may be disposed on the buffer layer BFL. The first and sixth semiconductor layers S1, A1, D1, S6, A6 and D6 may include polysilicon. However, an embodiment of the inventive concept is not limited thereto, and the first and sixth semiconductor layers S1, A1, D1, S6, A6 and D6 may include amorphous silicon.

Some of the first and sixth semiconductor layers S1, D1, S6 and D6 may be doped with an n-type dopant or a p-type dopant. The first and sixth semiconductor layers S1, A1, D1, S6, A6 and D6 may include heavy doped regions S1, D1, S6 and D6 and light doped regions A1 and A6.

The heavy doped regions S1, D1, S6 and D6 may have higher conductivity than the light doped regions A1 and A6, and may substantially serve as a source electrode and a drain electrode of each of the first and sixth transistors T1 and T6.

The light doped regions A1 and A6 may substantially correspond to actives of the first and sixth transistors T1 and T6. Hereinafter, the actives of the first and sixth transistors T1 and T6 are defined as channel regions.

A first source region S1, a first channel region A1, and a first drain region D1 of the first transistor T1 may be provided from the first semiconductor layers S1, A1 and D1. A sixth source region S6, a sixth channel region A6, and a sixth drain region D6 of the sixth transistor T6 may be provided from the sixth semiconductor layers S6, A6 and D6. The first channel region A1 may be disposed between the first source region S1 and the first drain region D1. The sixth channel region A6 may be disposed between the sixth source region S6 and the sixth drain region D6.

A first insulating layer INS1 may be disposed on the buffer layer BFL so as to cover the first and sixth semiconductor layers S1, A1, D1, S6, A6 and D6. Respective first and sixth gate electrodes G1 and G6 (or control electrodes) of the first and sixth transistors T1 and T6 may be disposed on the first insulating layer INS1.

Although not illustrated, respective structures of a source region, a channel region, a drain region, and a gate electrode of each of second, fifth, seventh, and eighth transistors T2, T5, T7 and T8 may be substantially the same as the first and sixth transistors T1 and T6.

A second insulating layer INS2 may be disposed on the first insulating layer INS1 so as to cover the first and sixth gate electrodes G1 and G6. A dummy electrode DME may be disposed on the second insulating layer INS2. The dummy electrode DME may be disposed on the first gate electrode G1 to overlap the first gate electrode G1 in a plan view. The dummy electrode DME and the first gate electrode G1 together may constitute the capacitor CST described above.

A third insulating layer INS3 may be disposed on the second insulating layer INS2 so as to cover the dummy electrode DME. Fourth semiconductor layers S4, A4 and D4 of the fourth transistor T4 may be disposed on the third insulating layer INS3. The fourth semiconductor layers S4, A4 and D4 may include an oxide semiconductor including a metal oxide. The oxide semiconductor may include a crystalline or amorphous oxide semiconductor.

The fourth semiconductor layers S4, A4 and D4 may include a plurality of regions classified according to whether a metal oxide is reduced. A region in which the metal oxide is reduced (hereinafter referred to as a reduced region) may have a higher conductivity than a region in which the metal oxide is not reduced (hereinafter referred to as a non-reduced region). The reduced region may substantially serve as a source electrode or a drain electrode of the fourth transistor T4. The non-reduced region may substantially correspond to an active (or channel) of the fourth transistor T4.

A fourth source region S4, a fourth channel region A4, and a fourth drain region D4 of the fourth transistor T4 may include the fourth semiconductor layers S4, A4 and D4. The fourth channel region A4 may be disposed between the fourth source region S4 and the fourth drain region D4.

A fourth insulating layer INS4 may be disposed on the third insulating layer INS3 so as to cover the fourth semiconductor layers S4, A4 and D4. A fourth gate electrodes G4 of the fourth transistor T4 may be disposed on the fourth insulating layer INS4.

A fifth insulating layer INS5 may be disposed on the fourth insulating layer INS4 so as to cover the fourth gate electrodes G4. The buffer layer BFL and the first to fifth insulating layers INS1 to INS5 may include inorganic layers.

Although not illustrated, respective structures of a source region, a channel region, a drain region, and a gate electrode of a third transistor T3 may be substantially the same as the fourth transistor T4.

A connection electrode CNE may be disposed between the sixth transistor T6 and the light emitting element OLED. The connection electrode CNE may electrically connect the sixth transistor T6 and the light emitting element OLED to each other. The connection electrode CNE may include a first connection electrode CNE1, a second connection electrode CNE2 disposed on the first connection electrode CNE1, and a third connection electrode CNE3 disposed on the second connection electrode CNE2.

The first connection electrode CNE1 may be disposed on the fifth insulating layer INS5 and connected to the sixth drain region D6 through a first contact hole CH1 defined in the first to fifth insulating layers INS1 to INS5. A sixth insulating layer INS6 may be disposed on the fifth insulating layer INS5 so as to cover the first connection electrode CNE1.

The second connection electrode CNE2 may be disposed on the sixth insulating layer INS6. The second connection electrode CNE2 may be connected to the first connection electrode CNE1 through a second contact hole CH2 defined in the sixth insulating layer INS6. A seventh insulating layer INS7 may be disposed on the sixth insulating layer INS6 so as to cover the second connection electrode CNE2. An eighth insulating layer INS8 may be disposed on the seventh insulating layer INS7. The sixth to eighth insulating layers INS6 to INS8 may include an inorganic layer or an organic layer.

The first electrode AE may be disposed on the eighth insulating layer INS8. The first electrode AE may be electrically connected to the second connection electrode CNE2 through a third contact hole CH3 defined in the seventh and eighth insulating layers INS7 and INS8.

A pixel defining film PDL which covers edges of the first electrode AE and does not covers a central portion of the first electrode AE may be disposed on the first electrode AE and the eighth insulating layer INS8. An opening portion PX_OP of the pixel defining film PDL may be defined in an area corresponding to the central portion of the first electrode AE.

The hole control layer HCL may be disposed on the first electrode AE and the pixel defining film PDL. The hole control layer HCL may be disposed, in common, in the emissive area LEA and the non-emissive area NLEA. The hole control layer HCL may include a hole transport layer and a hole injection layer.

The emission layer EL may be disposed on the hole control layer HCL. The emission layer EL may be exclusively disposed in an area corresponding to the opening portion PX_OP. The emission layer EL may include an organic material and/or an inorganic material. The emission layer EL may generate light of any one color of red, green, and blue colors.

The electron control layer ECL may be disposed on the emission layer EL and the hole control layer HCL. The electron control layer ECL may be disposed, in common, in the emission area LEA and the non-emission area NLEA. The electron control layer ECL may include an electron transport layer and an electron injection layer.

The second electrode CE may be disposed on the electron control layer ECL. The second electrode CE may be disposed, in common, in the pixels PX. That is, the second electrode CE may be disposed, in common, in the emission area LEA and the non-emission area NLEA on the emission layers EL of the pixels PX.

The layers from the buffer layer BFL to the eighth insulating layer INS8 may be defined as a circuit element layer DP-CL. The layer at which the light emitting element OLED is disposed may be defined as a display element layer DP-OLED.

The thin-film encapsulation layer TFE may be disposed on the light emitting element OLED. The thin-film encapsulation layer TFE may include an inorganic layer, an organic layer, and an inorganic layer which are stacked in sequence. The inorganic layers may each include an inorganic material and protect the pixels from moisture/oxygen. The organic layer may include an organic material and protect the pixels PX from foreign matter such as dust particles.

A first voltage ELVDD may be applied to the first electrode AE, and a second voltage ELVSS may be applied to the second electrode CE. A hole and an electron injected into the emission layer EL may be combined to generate an exciton, and the exciton may be transited to a ground state so that the light emitting element OLED emits light. As the light emitting element OLED emits light, an image may be displayed.

FIGS. 8A to 8I are views illustrating a plane structure of pixel circuits by steps.

Figure 8A:
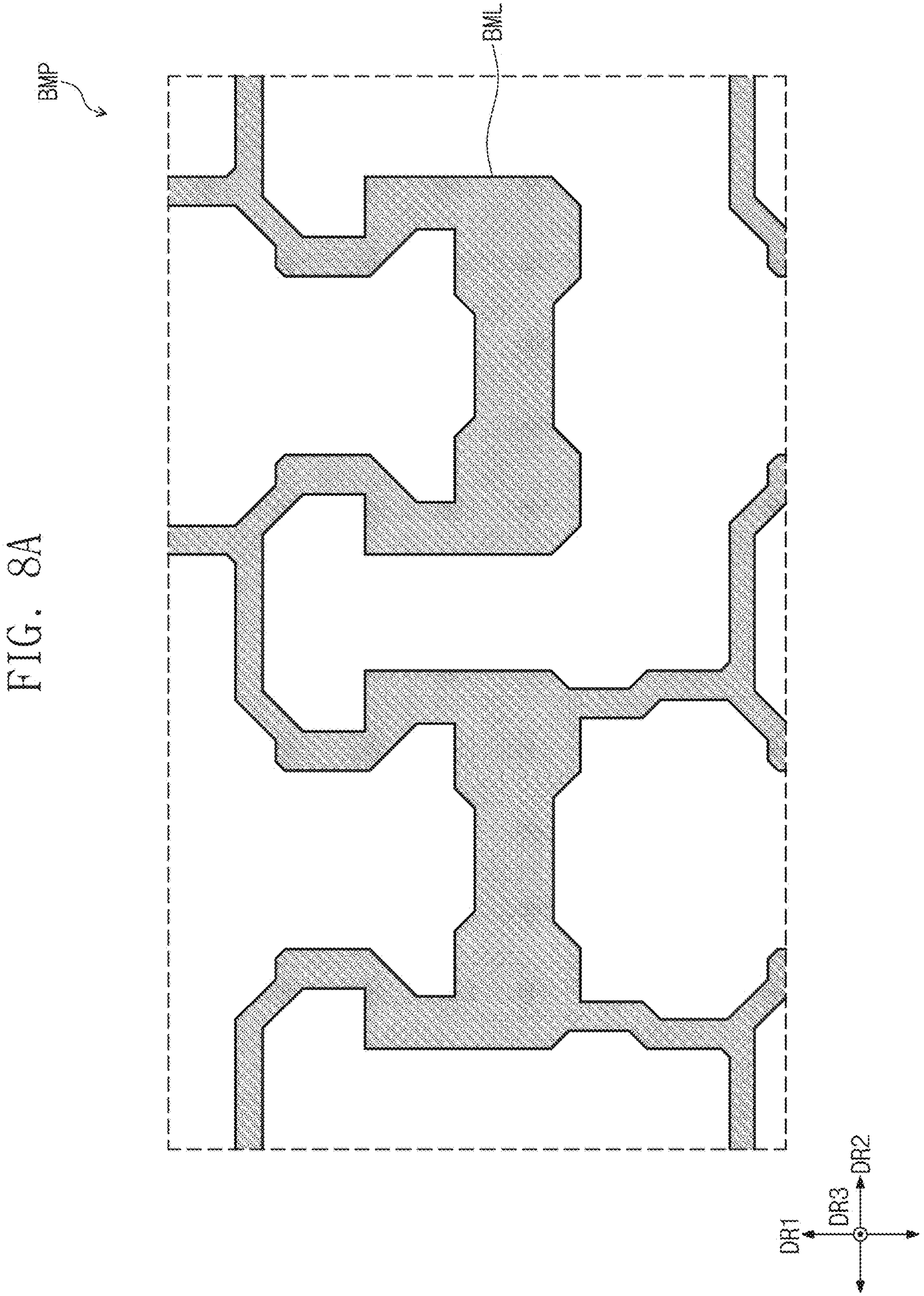
FIGS. 8A, 8B, 8C, 8D, 8E, 8F, 8G, 8H and 8I are views illustrating a plane structure of pixel circuits by steps.
Figure 8B:
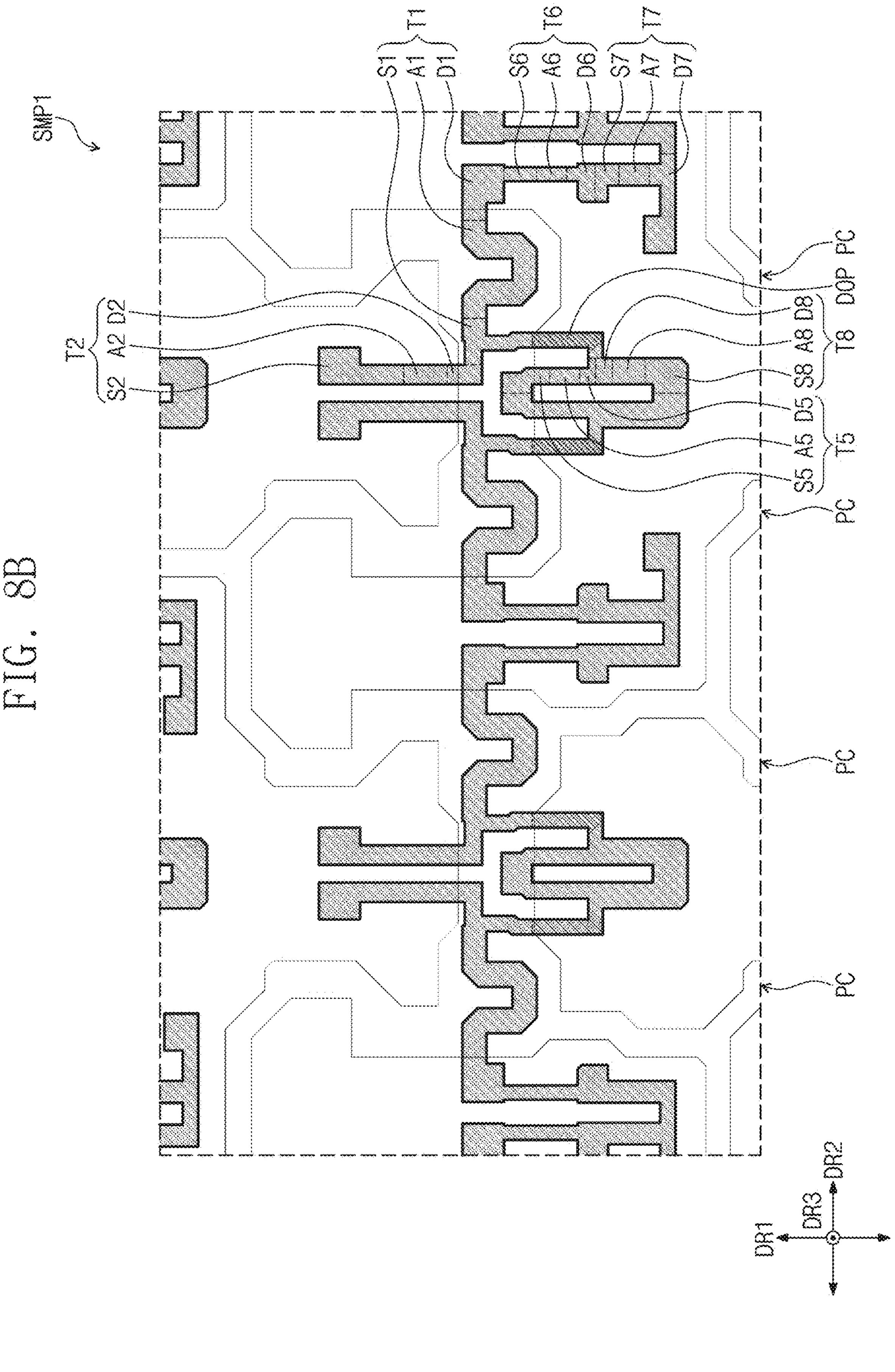
Figure 8C:
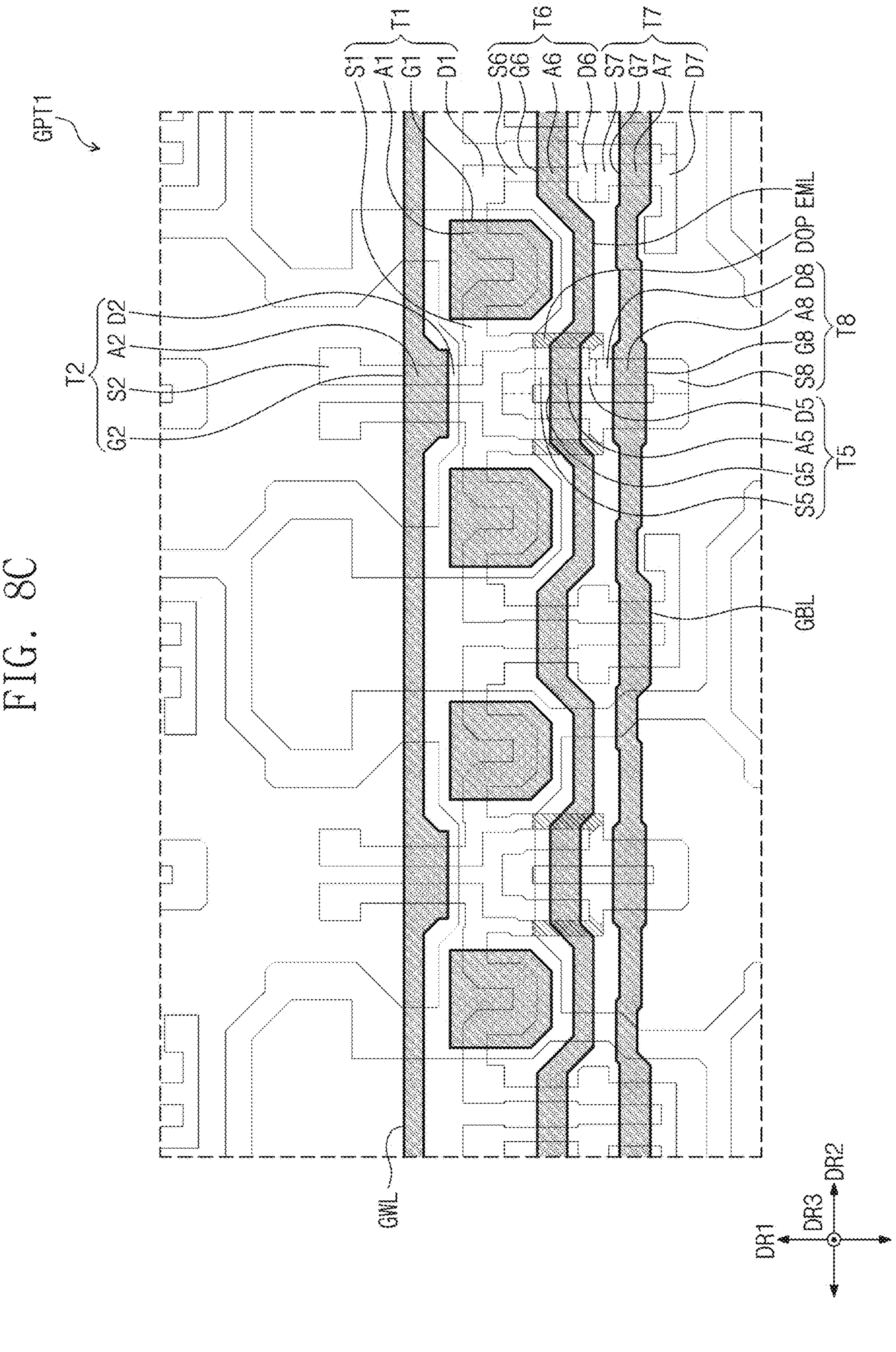
Figure 8D:
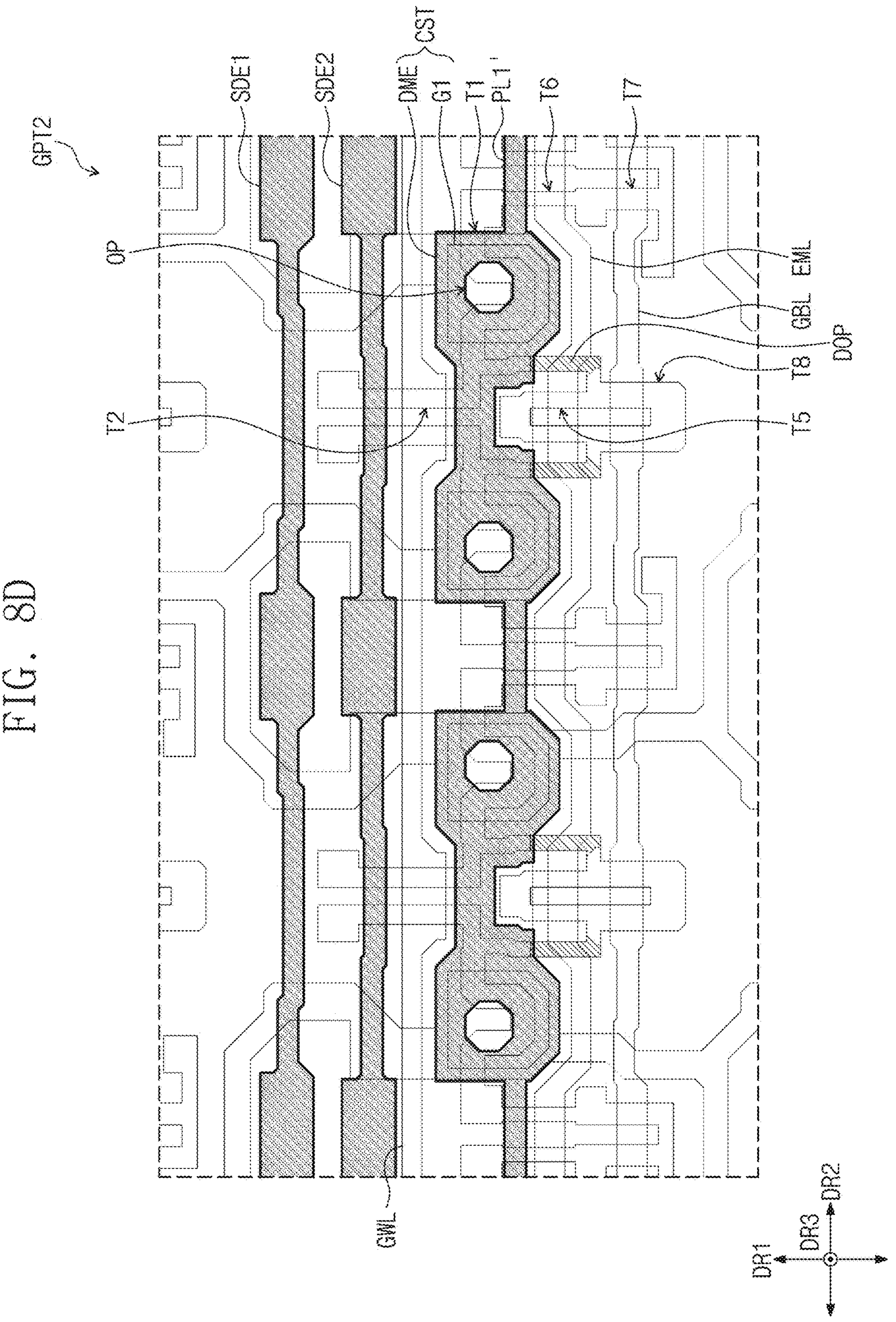
Figure 8E:
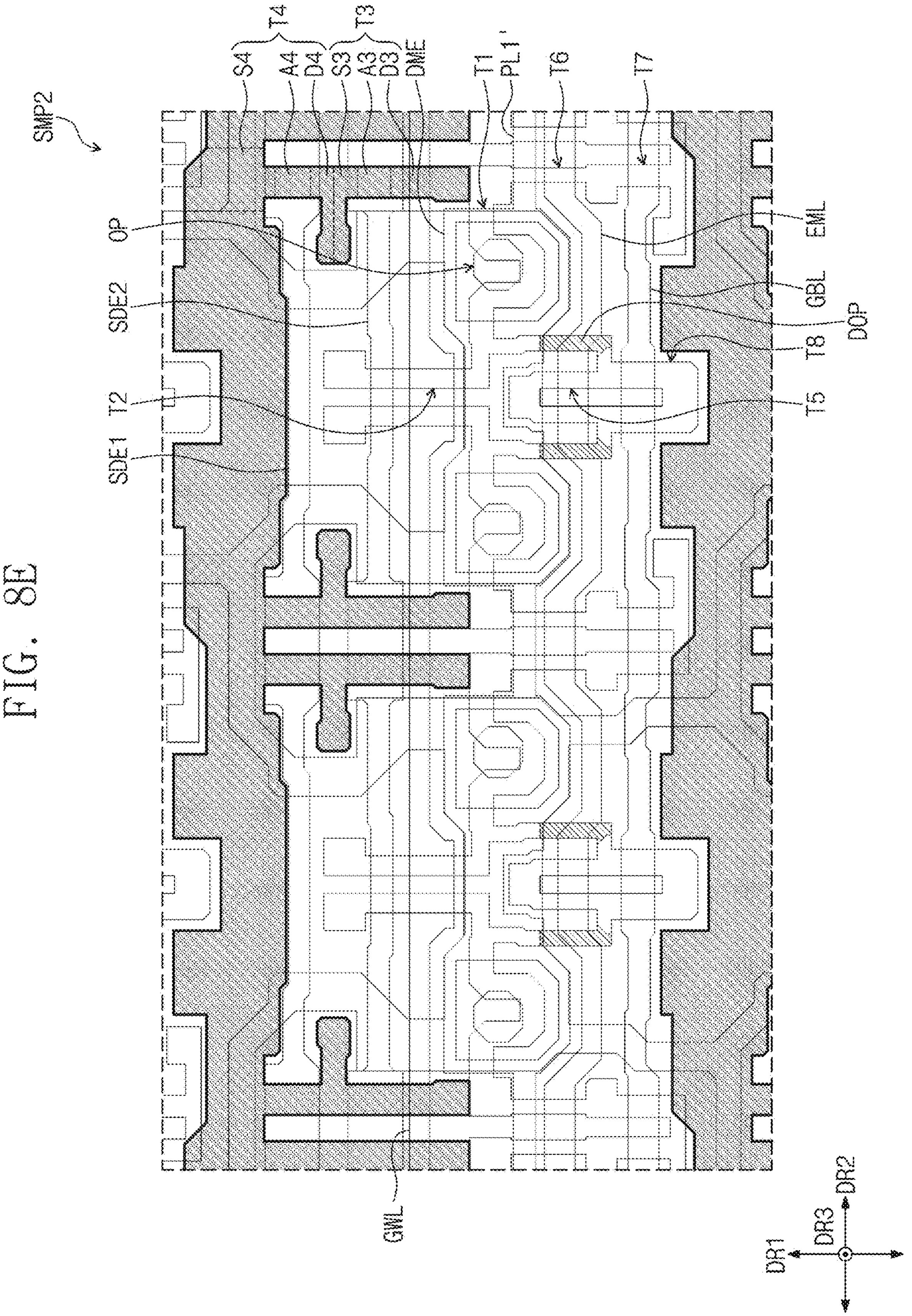

As an example, FIGS. 8A to 8I each illustrate a configuration of four pixel circuits PC adjacent to each other in the second direction DR2. For convenience of explanation, reference numerals or symbols for the pixel circuits PC are shown in FIGS. 8B and 8E.

Each of the pixel circuits PC may correspond to the pixel circuit PC illustrated in FIG. 5. The configurations of the pixel circuits PC are substantially the same, and thus a configuration of any one of the pixel circuits PC will be described below. For example, the configurations of the pixel circuits PC disposed on right and left sides will be described.

FIGS. 8A to 8I are layout diagrams of the pixel circuits PC. Hereinafter, when embodiments are described with reference to FIGS. 8A to 8I, the term "overlap" indicates a state in which components overlap each other in a plan view.

Referring to FIG. 8A, a lower conductive pattern BMP may be disposed on the substrate SUB illustrated in FIG. 7. The lower conductive pattern BMP is not limited to a shape illustrated in FIG. 8A, and may have various shapes. A lower metal layer BML may be provided by the lower conductive pattern BMP. The lower metal layer BML illustrated in FIG. 8A may be the lower metal layer BML illustrated in FIG. 7. Hereinafter, the reference numeral or symbol for the lower metal layer BML is omitted in the layout diagrams.

Referring to FIGS. 8A and 8B, a first semiconductor pattern SMP1 may be disposed on the lower conductive pattern BMP. The first semiconductor pattern SMP1 is not limited to a shape illustrated in FIG. 8B, and may have various shapes.

The first semiconductor pattern SMP1 may include first semiconductor layers S1, A1 and D1 of a first transistor T1, second semiconductor layers S2, A2 and D2 of a second transistor T2, fifth semiconductor layers S5, A5 and D5 of a fifth transistor T5, sixth semiconductor layers S6, A6 and D6 of a sixth transistor T6, seventh semiconductor layers S7, A7 and D7 of a seventh transistor T7, and eighth semiconductor layers S8, A8 and D8 of an eighth transistor T8.

The first semiconductor layers S1, A1 and D1 may include a first source region S1, a first drain region D1, and a first channel region A1 disposed between the first source region S1 and the first drain region D1. The second semiconductor layers S2, A2 and D2 may include a second source region S2, a second drain region D2, and a second channel region A2 disposed between the second source region S2 and the second drain region D2.

The fifth semiconductor layers S5, A5 and D5 may include a fifth source region S5, a fifth drain region D5, and a fifth channel region A5 disposed between the fifth source region S5 and the fifth drain region D5. The sixth semiconductor layers S6, A6 and D6 may include a sixth source region S6, a sixth drain region D6, and a sixth channel region A6 disposed between the sixth source region S6 and the sixth drain region D6.

The seventh semiconductor layers S7, A7 and D7 may include a seventh source region S7, a seventh drain region D7, and a seventh channel region A7 disposed between the seventh source region S7 and the seventh drain region D7. The eighth semiconductor layers S8, A8 and D8 may include an eighth source region S8, an eighth drain region D8, and an eighth channel region A8 disposed between the eighth source region S8 and the eighth drain region D8.

The first, second, fifth, sixth, seventh, and eighth source regions S1, S2, S5, S6, S7 and S8 and the first, second, fifth, sixth, seventh, and eighth drain regions D1, D2, D5, D6, D7 and D8 may be heavy doped regions. The first, second, fifth, sixth, seventh, and eighth channel regions A1, A2, A5, A6, A7 and A8 may be light doped regions.

Each of the first, second, fifth, sixth, seventh, and eighth source regions S1, S2, S5, S6, S7 and S8 and the first, second, fifth, sixth, seventh, and eighth drain regions D1, D2, D5, D6, D7 and D8 may have a higher conductivity than each of the first, second, fifth, sixth, seventh, and eighth channel regions A1, A2, A5, A6, A7 and A8.

The first, second, fifth, sixth, seventh, and eighth source regions S1, S2, S5, S6, S7 and S8 may correspond to the first electrodes of the above-described first, second, fifth, sixth, seventh, and eighth transistors T1, T2, T5, T6, T7 and T8, respectively. The first, second, fifth, sixth, seventh, and eighth drain regions D1, D2, D5, D6, D7 and D8 may correspond to the second electrodes of the above-described first, second, fifth, sixth, seventh, and eighth transistors T1, T2, T5, T6, T7 and T8, respectively.

The second drain region D2 of the second transistor T2, the fifth drain region D5 of the fifth transistor T5, and the eighth drain region D8 of the eighth transistor T8 may each extend from the first source region S1 of the first transistor T1. The sixth source region S6 of the sixth transistor T6 may extend from the first drain region D1 of the first transistor T1. The seventh source region S7 of the seventh transistor T7 may extend from the sixth drain region D6 of the sixth transistor T6.

According to this structure, the first transistor T1 may be connected to the second, fifth, sixth, and eighth transistors T2, T5, T6 and T8, and the sixth transistor T6 may be connected to the seventh transistor T7.

The first semiconductor pattern SMP1 may include a doped region DOP. The doped region DOP may be disposed between the first semiconductor layers S1, A1 and D1 and the fifth semiconductor layers S5, A5 and D5. The doped region DOP may extend from the first semiconductor layers S1, A1 and D1 to the fifth semiconductor layers S5, A5 and D5, and be formed integrally with the first semiconductor layers S1, A1 and D1 and the fifth semiconductor layers S5, A5 and D5.

The first semiconductor layers S1, A1 and D1, the second semiconductor layers S2, A2 and D2, the fifth semiconductor layers S5, A5 and D5, the sixth semiconductor layers S6, A6 and D6, the seventh semiconductor layers S7, A7 and D7, the eighth semiconductor layers S8, A8 and D8, and the doped region DOP may be formed integrally.

The doped region DOP may be a heavy doped region. That is, the doped region DOP may have a higher conductivity than each of the first, second, fifth, sixth, seventh, and eighth channel regions A1, A2, A5, A6, A7 and A8. As an example, the doped region DOP may include a semiconductor doped with a p-type dopant.

A doping concentration of the doped region DOP may be the same as or different from a doping concentration of each of the first, second, fifth, sixth, seventh, and eighth source regions S1, S2, S5, S6, S7 and S8 and the first, second, fifth, sixth, seventh, and eighth drain regions D1, D2, D5, D6, D7 and D8.

The doped region DOP may be doped before the first, second, fifth, sixth, seventh, and eighth source regions S1, S2, S5, S6, S7 and S8 and the first, second, fifth, sixth, seventh, and eighth drain regions D1, D2, D5, D6, D7 and D8 are doped. This doping process will be described in detail with reference to FIGS. 9 to 11.

In the following drawings, the words i-th and j-th having shown the order of the above-described lines are omitted. That is, the layout diagrams will be described without limiting lines by a specific ordinal number.

Referring to FIGS. 8A to 8C, a first gate pattern GPT1 may be disposed on the first semiconductor pattern SMP1. The first gate pattern GPT1 may include a write scan line GWL, an emission line EML, a bias scan line GBL, a the first gate electrode G1 of the first transistor T1.

The write scan line GWL, the emission line EML, and the bias scan line GBL may be arranged along the second direction DR2 in the first direction DR1. The emission line EML may be disposed between the write scan line GWL and the bias scan line GBL.

The first gate electrode G1 may be disposed between from the write scan line GWL and the emission line EML. The first gate electrode G1 may overlap the first channel region A1.

The write scan line GWL may extend so as to intersect the first semiconductor pattern SMP1. A second gate electrode G2 of the second transistor T2 may be provided by the write scan line GWL.

In a plan view, a portion of the write scan line GWL, which overlaps the first semiconductor pattern SMP1, may be defined as the second gate electrode G2. The second gate electrode G2 may overlap the second channel region A2. A portion of the first semiconductor pattern SMP1, which overlaps the write scan line GWL, may be defined as the second channel region A2.

The emission line EML may extend so as to intersect the first semiconductor pattern SMP1. A fifth gate electrode G5 of the fifth transistor T5 and a sixth gate electrode G6 of the sixth transistor T6 may be provided by the emission line EML.

In a plan view, portions of the emission line EML, which overlap the first semiconductor pattern SMP1, may be defined as the fifth and sixth gate electrodes G5 and G6. The fifth gate electrode G5 may overlap the fifth channel region A5 and the sixth gate electrode G6 may overlap the sixth channel region A6. Portions of the first semiconductor pattern SMP1, which overlap the emission line EML, may be defined as the fifth channel region A5 and the sixth channel region A6.

The bias scan line GBL may extend so as to intersect the first semiconductor pattern SMP1. A seventh gate electrode G7 of the seventh transistor T7 and an eighth gate electrode G8 of the eighth transistor T8 may be provided by the bias scan line GBL.

In a plan view, portions of the bias scan line GBL, which overlap the first semiconductor pattern SMP1, may be defined as the seventh and eighth gate electrodes G7 and G8. The seventh gate electrode G7 may overlap the seventh channel region A7, and the eighth gate electrode G8 may overlap the eighth channel region A8. Portions of the first semiconductor pattern SMP1, which overlap the bias scan line GBL, may be defined as the seventh channel region A7 and the eighth channel region A8.

The first, second, fifth, sixth, seventh, and eighth gate electrodes G1, G2, G5, G6, G7 and G8 may correspond to the control electrodes of the above-described first, second, fifth, sixth, seventh, and eighth transistors T1, T2, T5, T6, T7 and T8, respectively.

The doped region DOP may be disposed below a portion of the emission line EML and overlap the portion of the emission line EML in a plan view. A length of the doped region DOP in the first direction DR1 may be greater than a width of the emission line EML in the first direction DR1.

In the following layout diagrams, for convenience of explanation and a brief indication of reference numerals or symbols, the reference numerals or symbols for the first, second, and fifth to eighth source regions S1, S2 and S5 to S8, the first, second, and fifth to eighth drain regions D1, D2 and D5 to D8, the first, second, and fifth to eighth channel regions A1, A2 and A5 to A8, and the first, second, and fifth to eighth gate electrodes G1, G2 and G5 to G8 are omitted, and the reference numerals or symbols for the first, second, and fifth to eighth transistors T1, T2 and T5 to T8 are shown. According to a need for explanation, only FIG. 8D shows the reference numeral or symbol for the first gate electrode G1.

For the omitted reference numerals or symbols for the source regions S1, S2 and S5 to S8, the drain regions D1, D2 and D5 to D8, the channel regions A1, A2 and A5 to A8, and the gate electrodes G1, G2 and G5 to G8, see FIGS. 8B and 8C.

Referring to FIGS. 8A to 8D, a second gate pattern GPT2 may be disposed on the first gate pattern GPT1. The second gate pattern GPT2 may include an auxiliary power line PL1' including a dummy electrode DME, and first and second sub-dummy electrodes SDE1 and SDE2.

The dummy electrode DME may overlap the first gate electrode G1 described above. The dummy electrode DME may constitute a capacitor CST together with the first gate electrode G1. An opening portion OP may be defined in the dummy electrode DME.

The auxiliary power line PL1', the first sub-dummy electrode SDE1, and the second sub-dummy electrode SDE2 may extend along the second direction DR2 and be arranged in the first direction DR1. The auxiliary power line PL1' may be disposed to overlap the first gate electrode G1. The second sub-dummy electrode SDE2 may be disposed between the first sub-dummy electrode SDE1 and the auxiliary power line PL1'.

The auxiliary power line PL1' may be disposed between the write scan line GWL and the emission line EML in a plan view. The emission line EML may be disposed between the auxiliary power line PL1' and the bias scan line GBL. The write scan line GWL may be disposed between the auxiliary power line PL1' and the second sub-dummy electrode SDE2. The second sub-dummy electrode SDE2 may be disposed between the first sub-dummy electrode SDE1 and the write scan line GWL.

Figure 8F:
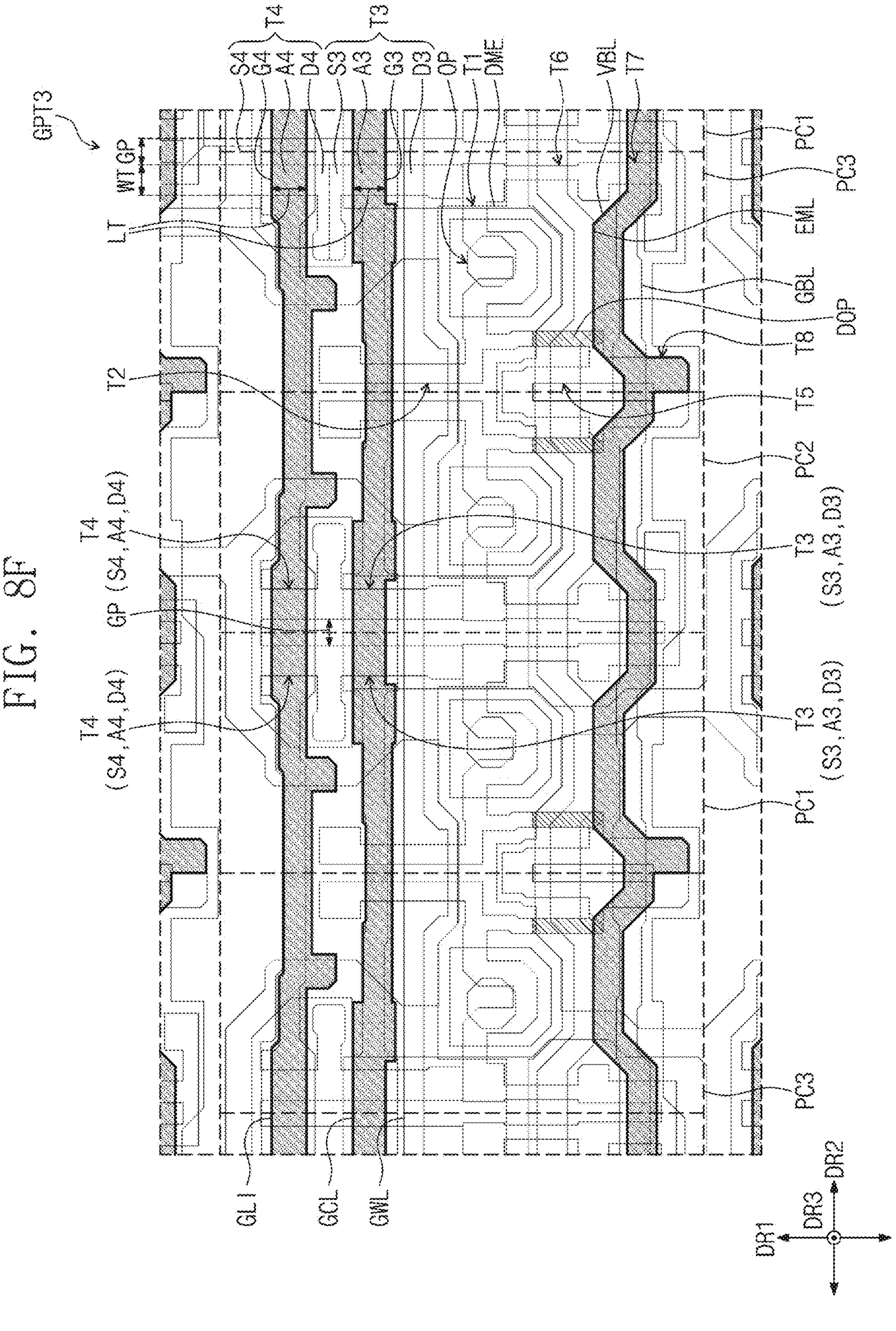

The first sub-dummy electrode SDE1 and the second sub-dummy electrode SDE2 may respectively overlap an initialization scan line GIL and a compensation scan line GCL, illustrated in FIG. 8F.

The auxiliary power line PL1' may be connected to a first power line PL1 to be described later with reference to FIG. 8H, and receive the first voltage ELVDD described above. Thus, the first voltage ELVDD may be applied to the dummy electrode DME of the capacitor CST through the auxiliary power line PL1'. Although the auxiliary power line PL1' is omitted in FIG. 4, a plurality of auxiliary power lines PL1' extending in the second direction DR2 may be substantially disposed within the display area DA.

Referring to FIGS. 8A to 8E, a second semiconductor pattern SMP2 may be disposed on the second gate pattern GPT2. The second semiconductor pattern SMP2 is not limited to a shape illustrated in FIG. 8E, and may have various shapes.

The second semiconductor pattern SMP2 may include third semiconductor layers S3, A3 and D3 of a third transistor T3 and fourth semiconductor layers S4, A4 and D4 of a fourth transistor T4. The third semiconductor layers S3, A3 and D3 and the fourth semiconductor layers S4, A4 and D4 may be formed integrally and extend in the first direction DR1.

The third semiconductor layers S3, A3 and D3 may include a third source region S3, a third drain region D3, and a third channel region A3 disposed between the third source region S3 and the third drain region D3. The fourth semiconductor layers S4, A4 and D4 may include a fourth source region S4, a fourth drain region D4, and a fourth channel region A4 disposed between the fourth source region S4 and the fourth drain region D4.

The third and fourth source regions S3 and S4 and the third and fourth drain regions D3 and D4 may each be a reduced region in which a metal oxide is reduced. The third and fourth channel regions A3 and A4 may each be a non-reduced region. Each of the third and fourth source regions S3 and S4 and the third and fourth drain regions D3 and D4 may have a higher conductivity than each of the third and fourth channel region A3 and A4.

The third and fourth source regions S3 and S4 may respectively correspond to the second electrodes of the third and fourth transistors T3 and T4 described above. The third and fourth drain regions D3 and D4 may respectively correspond to the first electrodes of the third and fourth transistors T3 and T4 described above.

The third source region S3 of the third transistor T3 may extend from the fourth drain region D4 of the fourth transistor T4. According to this structure, the third transistor T3 may be connected to the fourth transistor T4.

Hereinafter, in the layout diagrams, the reference numerals or symbols for an auxiliary power line PL1' and first and second sub-dummy electrodes SDE1 and SDE2 are omitted, and for the omitted reference numerals or symbols for the auxiliary power line PL1' and the first and second sub-dummy electrodes SDE1 and SDE2, see FIGS. 8D and 8E.

Referring to FIG. 8F, a third gate pattern GPT3 may be disposed on the second semiconductor pattern SMP2. The third gate pattern GPT3 may include a compensation scan line GCL, an initialization scan line GIL, and a bias line VBL. The compensation scan line GCL, the initialization scan line GIL, and the bias line VBL may extend along the second direction DR2 and be arranged in the first direction DR1.

The initialization scan line GIL may overlap the first sub-dummy electrode SDE1. The compensation scan line GCL may overlap the second sub-dummy electrode SDE2. The bias line VBL may overlap portions of the bias scan line GBL.

The compensation scan line GCL may extend to intersect the third semiconductor layers S3, A3 and D3 of the second semiconductor pattern SMP2. A third gate electrode G3 of the third transistor T3 may be provided by the compensation scan line GCL.

In a plan view, a portion of the compensation scan line GCL, which overlaps the second semiconductor pattern SMP2, may be defined as the third gate electrode G3. The third gate electrode G3 may overlap the third channel region A3. A portion of the second semiconductor pattern SMP2, which overlaps the compensation scan line GCL, may be defined as the third channel region A3 of the third semiconductor layers S3, A3 and D3.

The initialization scan line GIL may extend to intersect the fourth semiconductor layers S4, A4 and D4 of the second semiconductor pattern SMP2. A fourth gate electrode G4 of the fourth transistor T4 may be provided by the initialization scan line GIL.

In a plan view, a portion of the initialization scan line GIL, which overlaps the second semiconductor pattern SMP2, may be defined as the fourth gate electrode G4. The fourth gate electrode G4 may overlap the fourth channel region A4. A portion of the second semiconductor pattern SMP2, which overlaps the initialization scan line GIL, may be defined as the fourth channel region A4 of the fourth semiconductor layers S4, A4 and D4.

A width WT of each of the third channel region A3 and the fourth channel region A4 in the second direction DR2 may be set to be about 3.0 micrometers (μm). A length LT of each of the third channel region A3 and the fourth channel region A4 in the first direction DR1 may be set to be about 3.5 micrometers (μm).

The third and fourth gate electrodes G3 and G4 may respectively correspond to the control electrodes of the third and fourth transistors T3 and T4 described above.

Figure 8G:
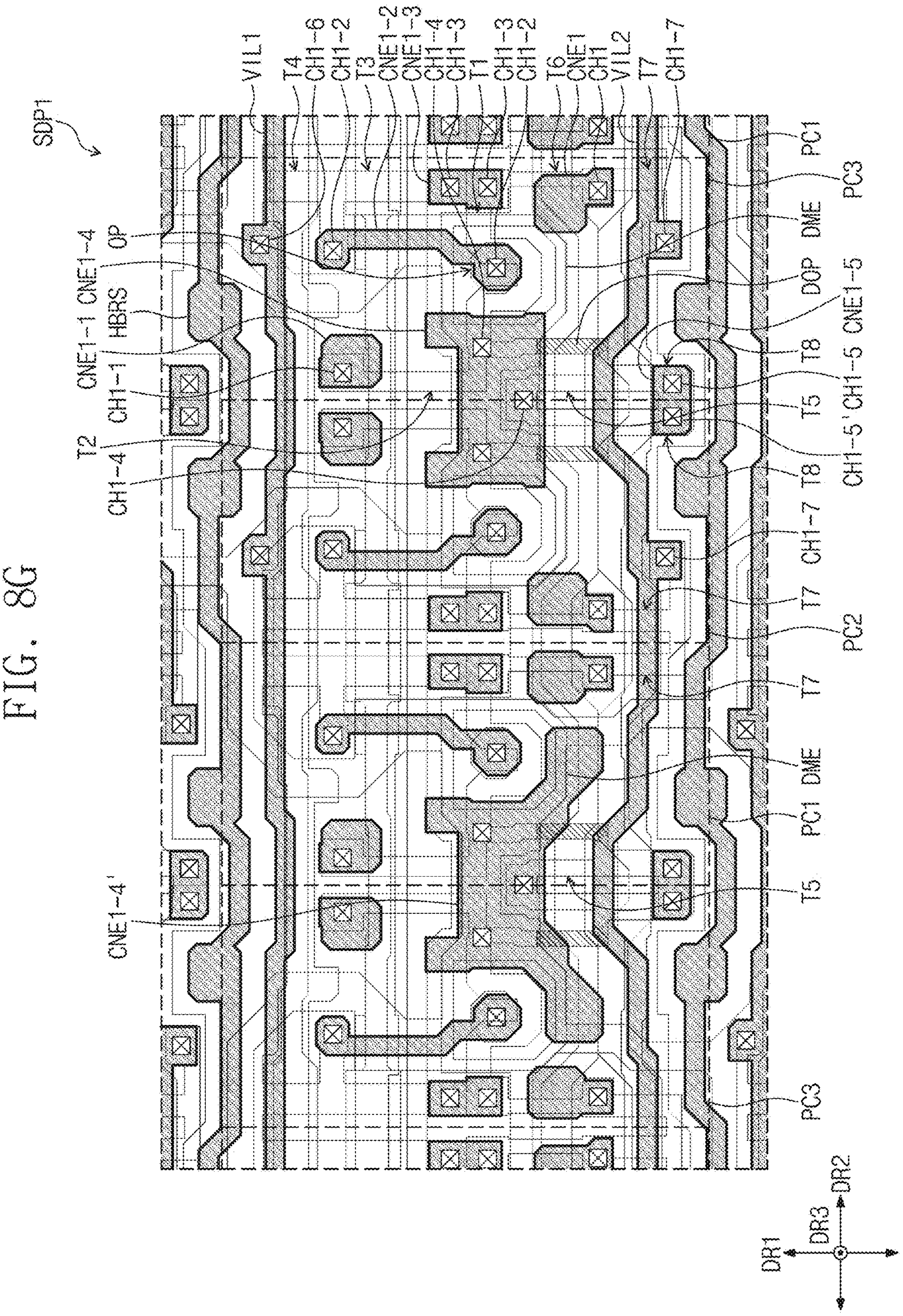

The pixel circuits PC described above may include a first pixel circuit PC1, a second pixel circuit PC2, and a third pixel circuit PC3 which are repeatedly arranged in the second direction DR2. For convenience of explanation, reference numerals or symbols for the first, second, and third pixel circuits PC1, PC2 and PC3 are shown in FIGS. 8F and 8G.

The first to eighth transistors T1 to T8 and the capacitor CST described above may be components of the third pixel circuit PC3. As each of the first pixel circuit PC1 and the second pixel circuit PC2 has the same components as the third pixel circuit PC3, the first pixel circuit PC1 and the second pixel circuit PC2 may each include the first to eighth transistors T1 to T8 and the capacitor CST like the third pixel circuit PC3.

The first pixel circuit PC1 and the second pixel circuit PC2 may be adjacent to each other in the second direction DR2. Third and fourth semiconductor layers S3, A3, D3, S4, A4 and D4 of the first pixel circuit PC1 and third and fourth semiconductor layers S3, A3, D3, S4, A4 and D4 of the second pixel circuit PC2 may be adjacent to each other in the second direction DR2.

A gap GP between the third and fourth semiconductor layers S3, A3, D3, S4, A4 and D4 of the first pixel circuit PC1 and the third and fourth semiconductor layers S3, A3, D3, S4, A4 and D4 of the second pixel circuit PC2 in the second direction DR2 may be set to be about 2.5 micrometers (μm) to about 3.5 micrometers (μm). The gap GP may be set to be about 3.0 micrometers (μm).

In addition, a gap GP between third and fourth semiconductor layers S3, A3, D3, S4, A4 and D4 of the third pixel circuit PC3 and third and fourth semiconductor layers S3, A3, D3, S4, A4 and D4 of the first pixel circuit PC1, which disposed at the right of the second pixel circuit PC1, may be set to be about 2.5 micrometers (μm) to about 3.5 micrometers (μm. The gap GP may be set to be about 3.0 micrometers (μm).

In the following layout diagrams, for convenience of explanation and a brief indication of reference numerals or symbols, reference numerals or symbols for the third and fourth source regions S3 and S4, the third and fourth drain regions D3 and D4, the third and fourth channel regions A3 and A4, and the third and fourth gate electrodes G3 and G4 are omitted, and reference numerals or symbols for the third and fourth transistors T3 and T4 are shown in FIG. 8E and FIG. 8F. In addition, reference numerals or symbols for the write scan line GWL, the emission line EML, the compensation scan line GCL, the initialization scan line GIL, the bias scan line GBL, and the bias line VBL are omitted.

For the omitted reference numerals or symbols for the source regions S3 and S4, the drain regions D3 and D4, the channel regions A3 and A4, the gate electrodes G3 and G4, the write scan line GWL, the emission line EML, the compensation scan line GCL, the initialization scan line GIL, the bias scan line GBL, and the bias line VBL, see FIGS. 8E and 8F.

Referring to FIGS. 8A to 8G, a first connection pattern SDP1 may be disposed on the third gate pattern GPT3. The first connection pattern SDP1 may be defined as a first source-drain pattern.

The first connection pattern SDP1 may include a plurality of first connection electrodes CNE1 and CNE1-1 to CNE1-5, a first initialization line VIL1, a second initialization line VIL2, and a horizontal line HBRS. The first connection electrode CNE1 may be the first connection electrode CNE1 illustrated in FIG. 7.

The first initialization line VIL1, the second initialization line VIL2, and the horizontal line HBRS may extend along the second direction DR2 and be arranged in the first direction DR1. The first initialization line VIL1 may be adjacent to the fourth transistor T4, and the second initialization line VIL2 may be adjacent to the seventh transistor T7. The horizontal line HBRS may be more adjacent to an upper side of the pixel circuit PC than the first initialization line VIL1 is.

The first connection electrodes CNE1 and CNE1-1 to CNE1-5, the first initialization line VIL1, the second initialization line VIL2, and the horizontal line HBRS may be disposed on the same layer. The first connection electrodes CNE1 and CNE1-1 to CNE1-5, the first initialization line VIL1, the second initialization line VIL2, and the horizontal line HBRS may be patterned with the same material at the same time.

A plurality of first contact holes CH1 and CH1-1 to CH1-7 may be defined. The first contact hole CH1 may be the first contact hole CH1 illustrated in FIG. 7. The first contact holes CH1-1 to CH1-7 may be defined to be similar to the first contact hole CH1 illustrated in FIG. 7.

The first connection electrode CNE1 may be connected to the sixth drain region D6 of the sixth transistor T6 through the first contact hole CH1.

The first connection electrode CNE1-1 may be connected to the second transistor T2 through the first contact hole CH1-1. The first connection electrode CNE1-1 may be connected to the second source region S2 of the second transistor T2.

The first connection electrode CNE1-2 may be connected to the third and fourth transistors T3 and T4 and a first transistor T1 through the first contact hole CH1-2. The first connection electrode CNE1-1 may be connected to the third source region S3 of the third transistor T3, the fourth drain region D4 of the fourth transistor T4, and the first gate electrode G1 of the first transistor T1. The third and fourth transistors T3 and T4 may be connected to the first transistor T1 by the first connection electrode CNE1-1.

An opening portion OP may be defined in the dummy electrode DME, and a portion of the first gate electrode G1 in an area corresponding to the opening portion may not be covered by the dummy electrode DME. The first contact hole CH1-2 may be defined in an area corresponding to the opening portion OP, and thus the first connection electrode CNE1-2 may be easily connected to the first gate electrode G1.

The first connection electrode CNE1-3 may be connected to the third transistor T3 and the first and sixth transistors T1 and T6 through the first contact hole CH1-3. The first connection electrode CNE1-3 may be connected to the first drain region D1 of the first transistor T1, the sixth source region S6 of the sixth transistor T6, and the third drain region D3 of the third transistor T3. The third transistor T3 may be connected to the first and sixth transistors T1 and T6 by the first connection electrode CNE1-3.

The first connection electrode CNE1-4 may be connected to the fifth transistor T5 and the dummy electrode DME of a capacitor CST through the first contact hole CH1-4. The first connection electrode CNE1-4 may be connected to the fifth source region S5 of the fifth transistor T5. As the first connection electrode CNE1-4 is connected to the dummy electrode DME, the first connection electrode CNE1-4 may be connected to the auxiliary power line PL1' described above.

A first connection electrode CNE1-4' may be spaced apart from the first connection electrode CNE1-4 in the second direction DR2, and be connected to the fifth transistor T5 of the first pixel circuit PC1 and the dummy electrode DME. As the first connection electrode CNE1-4' is connected to the dummy electrode DME, the first connection electrode CNE1-4' may be connected to the auxiliary power line PL1' described above, together with the first connection electrode CNE1-4. The first connection electrode CNE1-4' may overlap the first pixel circuit PC1.

The first connection electrode CNE1-5 may be connected to the bias line VBL through the first contact hole CH1-5. The first connection electrode CNE1-5 may be connected to the eighth transistor T8 of the second pixel circuit PC2 through a firs contact hole CH1-5' defined to be adjacent to the first contact hole CH1-5.

The semiconductor layer (see FIG. 8B) of the eighth transistor T8 of the second pixel circuit PC2 and the semiconductor layer (see FIG. 8B) of an eighth transistor T8 of the third pixel circuit PC3 may be formed integrally. The first connection electrode CNE1-5 may be connected to the eighth source region S8 of the eighth transistor T8 of the second pixel circuit PC2 through the first contact hole CH1-5', and the eighth source region S8 of the eighth transistor T8 of the third pixel circuit PC3 may extend from the eighth source region S8 of the eighth transistor T8 of the second pixel circuit PC2.

Thus, the first connection electrode CNE1-5 may connect, through the first contact holes CH1-5 and CH1-5', the bias line VBL to the eighth source regions S8 of the eighth transistors T8 of the second and third pixel circuits PC2 and PC3. As a result, a bias voltage VOBS may be applied to the eighth transistors T8.

The first initialization line VIL1 may be connected to the fourth source region S4 of the fourth transistor T4 through the first contact hole CH1-6. Thus, the fourth transistor T4 may receive a first initialization voltage VINT through the first initialization line VIL1.

The second initialization line VIL2 may be connected to the seventh drain region D7 of the seventh transistor T7 through the first contact hole CH1-7. Thus, the seventh transistor T7 may receive a second initialization voltage VAINT through the second initialization line VIL2.

The seventh transistor T7 of the first pixel circuit PC1 and the seventh transistor T7 of the second pixel circuit PC2 may be connected to the second initialization line VIL2 through the first contact hole CH1-7 of the second pixel circuit PC2. That is, the seventh transistor T7 of the first pixel circuit PC1 may not be connected to the second initialization line VIL2 through a separate contact hole, and the seventh transistor T7 of the second pixel circuit PC2 may not be connected to the second initialization line VIL2 through a separate contact hole.

The seventh transistor T7 of the first pixel circuit PC1 and the seventh transistor T7 of the second pixel circuit PC2 may be connected, in common, to the second initialization line VIL2 through the first contact hole CH1-7 that is a single contact hole. In addition, the seventh transistors T7 of the third pixel circuit PC3 and the first pixel circuit PC1, which are disposed at the right of the second pixel circuit PC2, may be connected, in common, to the second initialization line VIL2 through the first contact hole CH1-7 that is a single contact hole.

In an embodiment of the inventive concept, the seventh transistors T7 of the two pixel circuits may be connected, in common, to the second initialization line VIL2 through a single contact hole, not through two contact holes. Thus, the number of the contact holes may be decreased.

In the following layout diagrams, for a brief indication of reference numerals or symbols, reference numerals or symbols for the first connection electrodes CNE1 and CNE1-1 to CNE1-5, the first contact holes CH1 and CH1-1 to CH1-7, the dummy electrode DME, the first and second initialization lines VIL1 and VIL2, and the horizontal line HBRS are omitted.

For the omitted reference numerals or symbols for the first connection electrodes CNE1 and CNE1-1 to CNE1-5, the first contact holes CH1 and CH1-1 to CH1-7, the dummy electrode DME, the first and second initialization lines VIL1 and VIL2, and the horizontal line HBRS, see FIG. 8G.

Referring to FIGS. 8A to 8H, a second connection pattern SDP2 may be disposed on the first connection pattern SDP1. The second connection pattern SDP2 may be defined as a second source-drain pattern.

The second connection pattern SDP2 may include a second connection electrode CNE2, a data line DL, a vertical line VBRS, and a first power line PL1. The second connection electrode CNE2 may be the second connection electrode CNE2 illustrated in FIG. 7.

The data line DL, the vertical line VBRS, and the first power line PL1 may extend along the first direction DR1 and be arranged in the second direction DR2. The vertical line VBRS may be disposed between the data line DL and the first power line PL1.

The second connection electrode CNE2, the data line DL, the vertical line VBRS, and the first power line PL1 may be disposed on the same layer. The second connection electrode CNE2, the data line DL, the vertical line VBRS, and the first power line PL1 may be patterned with the same material at the same time.

A plurality of second contact holes CH2 and CH2-1 to CH2-3 may be defined. The second contact hole CH2 may be the second contact hole CH2 illustrated in FIG. 7. The second contact hole CH2-1 to CH2-3 may be defined to be similar to the second contact hole CH2 illustrated in FIG. 7.

The second connection electrode CNE2 may be connected to the first connection electrode CNE1 through the second contact hole CH2. Thus, the second connection electrode CNE2 may be connected to the sixth transistor T6 through the first connection electrode CNE1.

The data line DL may be connected to the first connection electrode CNE1-1 through the second contact hole CH2-1. The data line DL may be connected to the second transistor T2 through the first connection electrode CNE1-1.

The vertical line VBRS may be connected to the horizontal line HBRS through the second contact hole CH2-2.

Figure 8H:
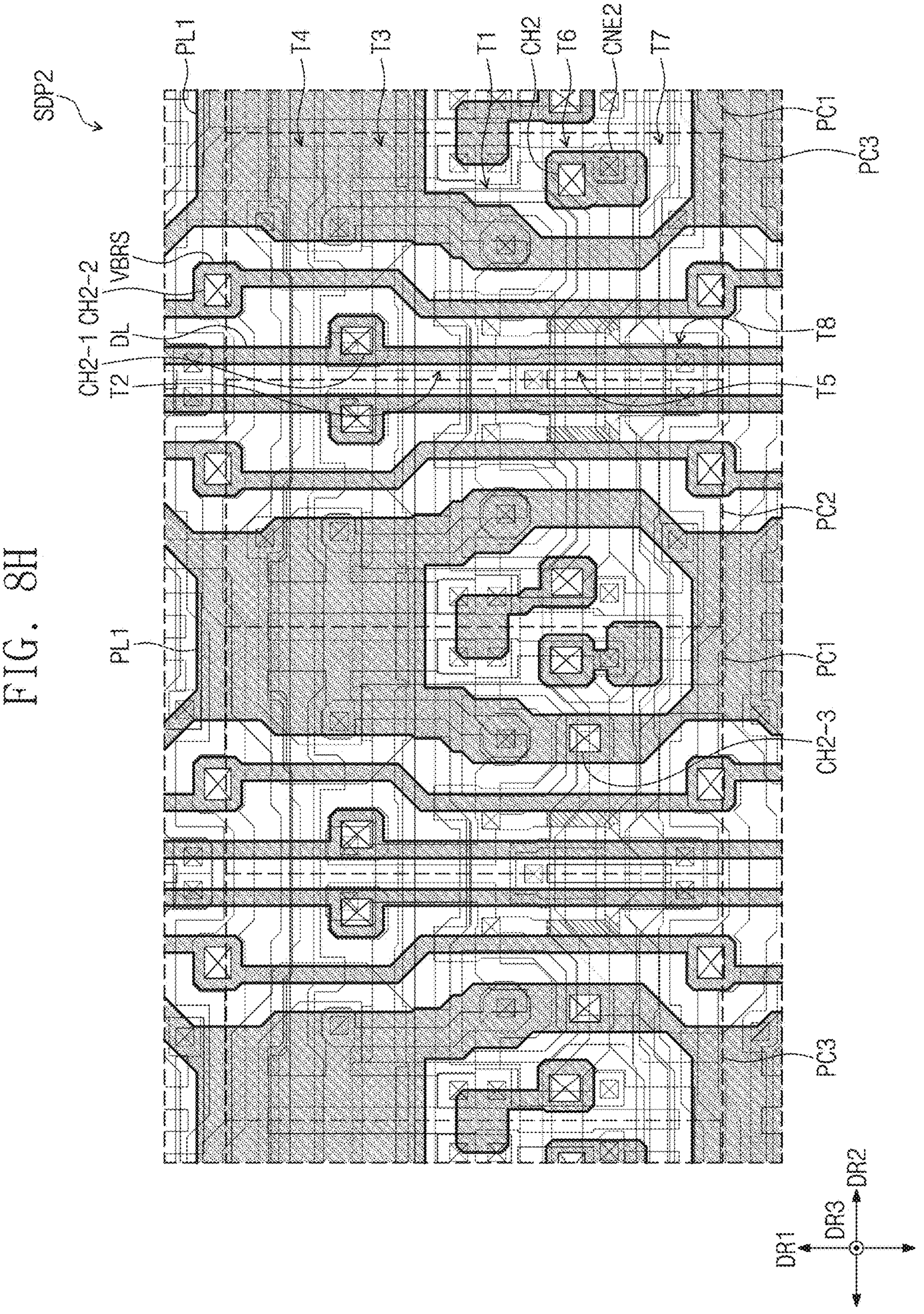

Among the first power lines PL1 illustrated in FIG. 8H, the first power line PL1 overlapping the first and second pixel circuits PC1 and PC2 may be connected to a first connection electrode CNE1-3' through the second contact hole CH2-3. The first voltage ELVDD may be applied to the first connection electrode CNE1-3' through the first power line PL1.

As illustrated in FIG. 8G, the first connection electrode CNE1-3 and the first connection electrode CNE1-3' may be connected to the auxiliary power line PL1'. The first connection electrode CNE1-3 may be connected to the dummy electrode DME and the fifth transistor T5, and the auxiliary power line PL1' may include the dummy electrode DME. Thus, the first voltage ELVDD may be applied to the first connection electrode CNE1-3, the dummy electrode DME, and the fifth transistor T5 through the first connection electrode CNE1-3' and the auxiliary power line PL1'.

Figure 8I:
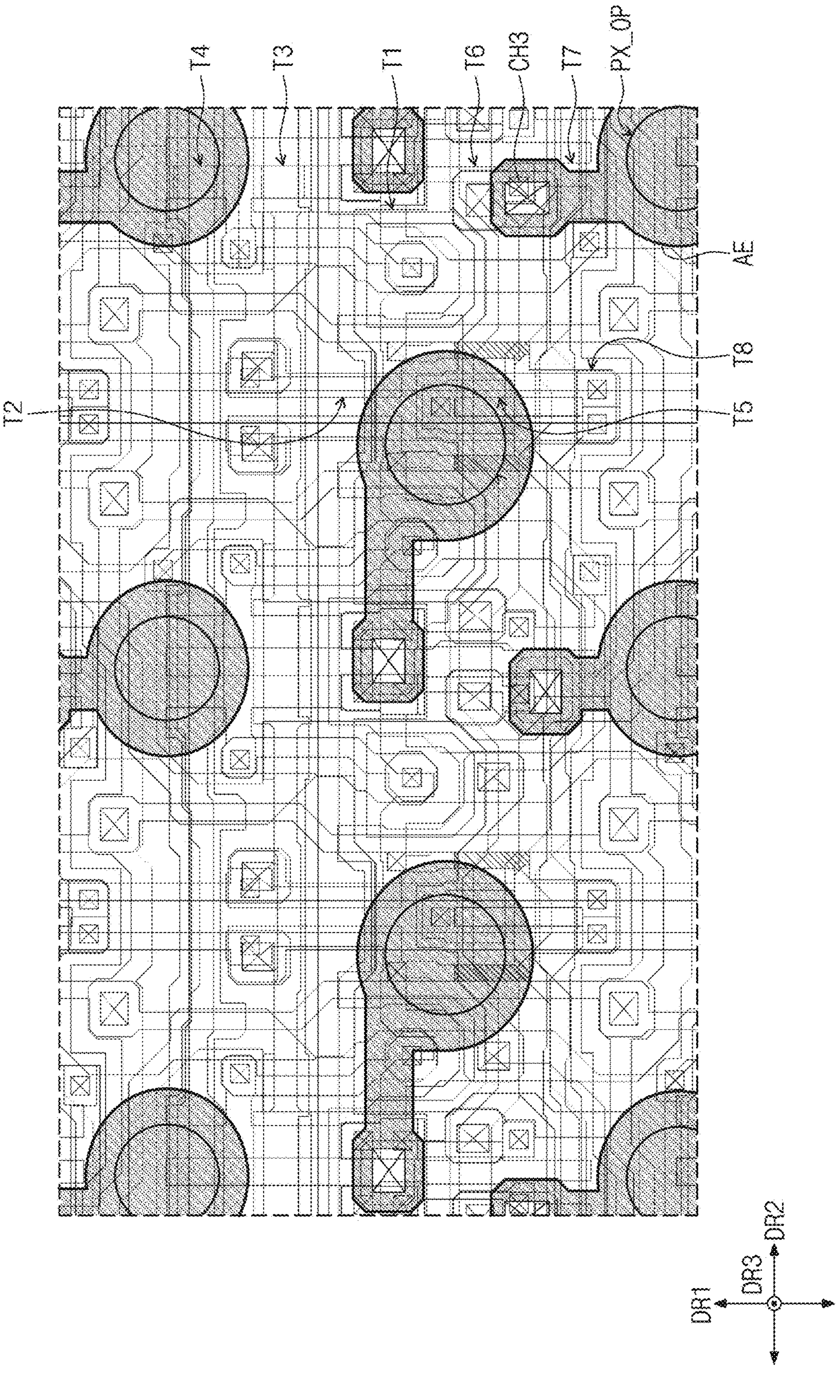

Hereinafter, in FIG. 8I that is a layout diagram, reference numerals or symbols for the second connection electrode CNE2, the data line DL, the vertical line VBRS, the first power line PL1, and the second contact holes CH2 and CH2-1 to CH2-3 are omitted. For the omitted reference numerals or symbols for the second connection electrode CNE2, the data line DL, the vertical line VBRS, the first power line PL1, and the second contact holes CH2 and CH2-1 to CH2-3, see FIG. 8H.

Referring to FIGS. 8A to 8I, a first electrode AE may be disposed on the second connection pattern SDP2. The first electrode AE may be the first electrode AE of the light emitting element OLED illustrated in FIG. 7.

The first electrode AE may be connected to the second connection electrode CNE2 through a third contact hole CH3. Thus, the first electrode AE may be connected to the sixth transistor T6 through the second connection electrode CNE2 and the first connection electrode CNE1.

An opening portion PX_OP may be defined on the first electrode AE, and the opening portion PX_OP may be defined in the pixel defining film PDL illustrated in FIG. 7.

Figure 9:
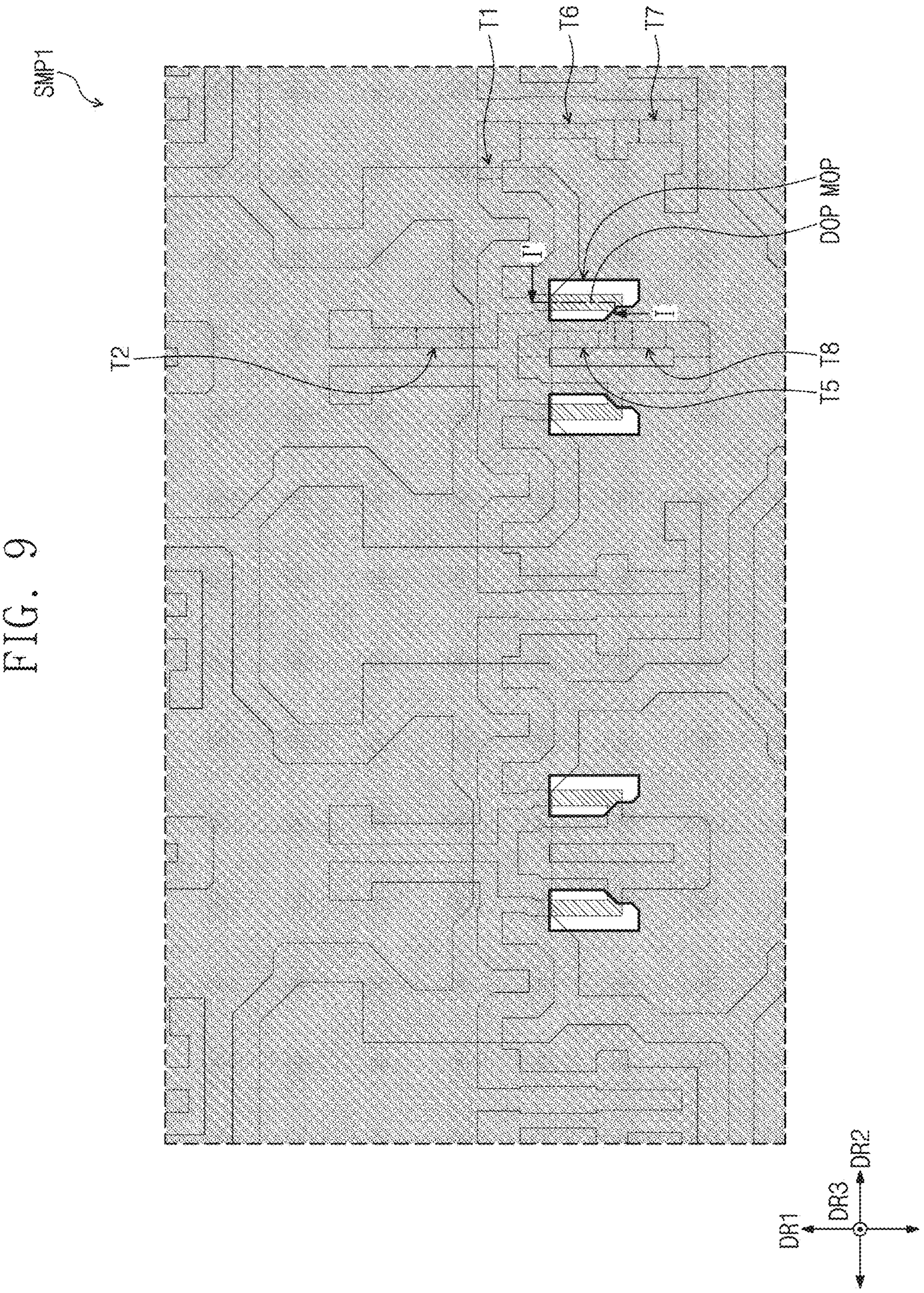
FIG. 9 is a view for describing a method for manufacturing a doped region illustrated in FIG. 8B.
Figure 10:
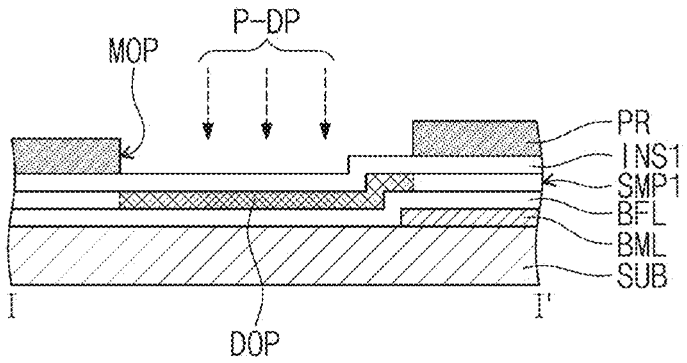
FIG. 10 is a cross-sectional view corresponding to line I-I' illustrated in FIG. 9.

FIG. 9 is a view for describing a method for manufacturing a doped region illustrated in FIG. 8B. FIG. 10 is a cross-sectional view corresponding to line I-I' illustrated in FIG. 9.

Referring to FIGS. 9 and 10, a photoresist layer PR may be disposed on a first insulating layer INS1. An opening portion MOP may be defined in the photoresist layer PR. The doped region DOP may be formed in an area of the first semiconductor pattern SMP1 corresponding to the opening portion MOP.

The photoresist layer PR may be used as a mask to perform a doping process for a first semiconductor pattern SMP1. A dopant P-DP may be provided to the first semiconductor pattern SMP1 through the opening portion MOP. Thus, a portion of the first semiconductor pattern SMP1, which is not covered by the photoresist layer PR, may be doped to form the doped region DOP. The doping process for forming the doped region DOP may be performed before an emission line EML is provided on the first insulating layer INS1.

Figure 11:
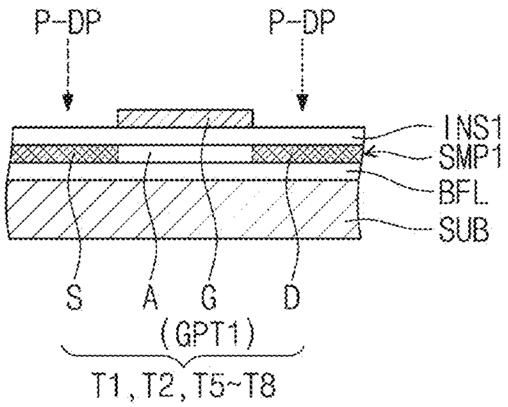
FIG. 11 is a view for describing a doping process for a semiconductor layer of each of first, second, and fifth to eighth transistors.

FIG. 11 is a view for describing a doping process for a semiconductor layer of each of first, second, and fifth to eighth transistors.

Hereinafter, for convenience of explanation, like reference numerals or symbols refer to gate electrodes, source regions, channel regions, and drain regions of first, second, and fifth to eighth transistors T1, T2 and T5 to T8 are used in FIG. 11.

Referring to FIG. 11, substantially the same doping processes may be performed on the first, second, and fifth to eighth transistors T1, T2 and T5 to T8. For example, a gate electrode G may be provided on a first insulating layer INS1, and then a doping process for a first semiconductor layer SMP1 may be performed using the gate electrode G as a self-aligned mask. That is, a first gate pattern GPT1 may be used as a self-aligned mask to perform the doping process for the first semiconductor layer SMP1 for forming a source region S and a drain region D.

A dopant P-DP may be provided to a portion of the first semiconductor layer SMP1, which is not covered by the gate electrode G. Thus, a source region S and a drain region D of the first semiconductor layers SMP1 of each of the first, second, and fifth to eighth transistors T1, T2 and T5 to T8 may be formed. A channel region A may be formed in a portion of the first semiconductor layer SMP1 which is covered by the gate electrode G.

The doping process for the doped region DOP may be performed before the doping process for the source region S and the drain region D. Thus, the doped region DOP may be doped before the source region S and the drain region D are doped.

Figure 12:
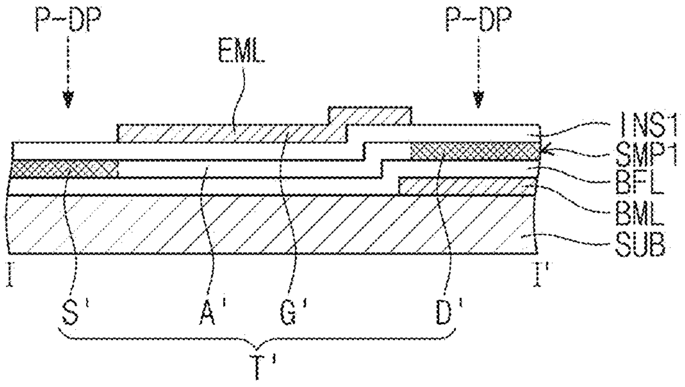
FIG. 12 is a view for describing a doping process for a semiconductor layer according to a comparative example in a cross-sectional view corresponding to FIG. 10.

FIG. 12 is a view for describing a doping process for a semiconductor layer according to a comparative example in a cross-sectional view corresponding to FIG. 10.

Referring to FIG. 12, a doping process for forming a doped region DOP may not be performed, and an emission line EML may be disposed on a first semiconductor layer SMP1 which is not doped with dopant P-DP. The emission line EML may be provided on a first insulating layer INS1.

As described with reference to FIG. 11, the doping process may be performed using a gate electrode G of a first gate pattern GPT1 as a mask. The gate electrode G of a fifth transistor T5 may be formed to dispose the emission line EML on the same layer as the gate electrode G of the fifth transistor T5. Thus, during the doping process of the source region S and the drain region D of the fifth transistor T5 and the sixth transistor T6, the emission line EML of the first gate pattern GPT1 may be used as a mask to perform the doping process.

In a case in which the doping process is performed using the emission line EML as a mask, semiconductor layers S', A' and D' of an additional transistor T' (hereinafter referred to as a dummy transistor) may be formed. That is, a dummy source region S', a dummy channel region A', and a dummy drain region D' of the dummy transistor T' may be formed. The dummy channel region A' may overlap the emission line EML.

Thus, the separate dummy transistor T' may be formed in addition to the first to eighth transistors T1 to T8. In a case in which the undesired dummy transistor T' is formed, a pixel circuit PC may be abnormally driven.

In an embodiment of the inventive concept, a portion of the first semiconductor pattern SMP1, which overlaps the emission line EML, may be pre-doped to form the doped region DOP. In this case, even when the emission line EML is used as a self-aligned mask to perform the doping process for forming the source region S and the drain region D of the fifth transistor T5 and the sixth transistor T6, the dummy channel region A' may not be formed. Thus, the dummy transistor T' may not be formed, and thus the pixel circuit PC may be normally driven.

The doped region DOP, a source region S, and a drain region D may each have a higher conductivity than the channel region A. According to a doping concentration, the doped region DOP may have the same doping concentration as the source region S and the drain region D, or have a different doping concentration from the source region S and the drain region D.

Figure 13:
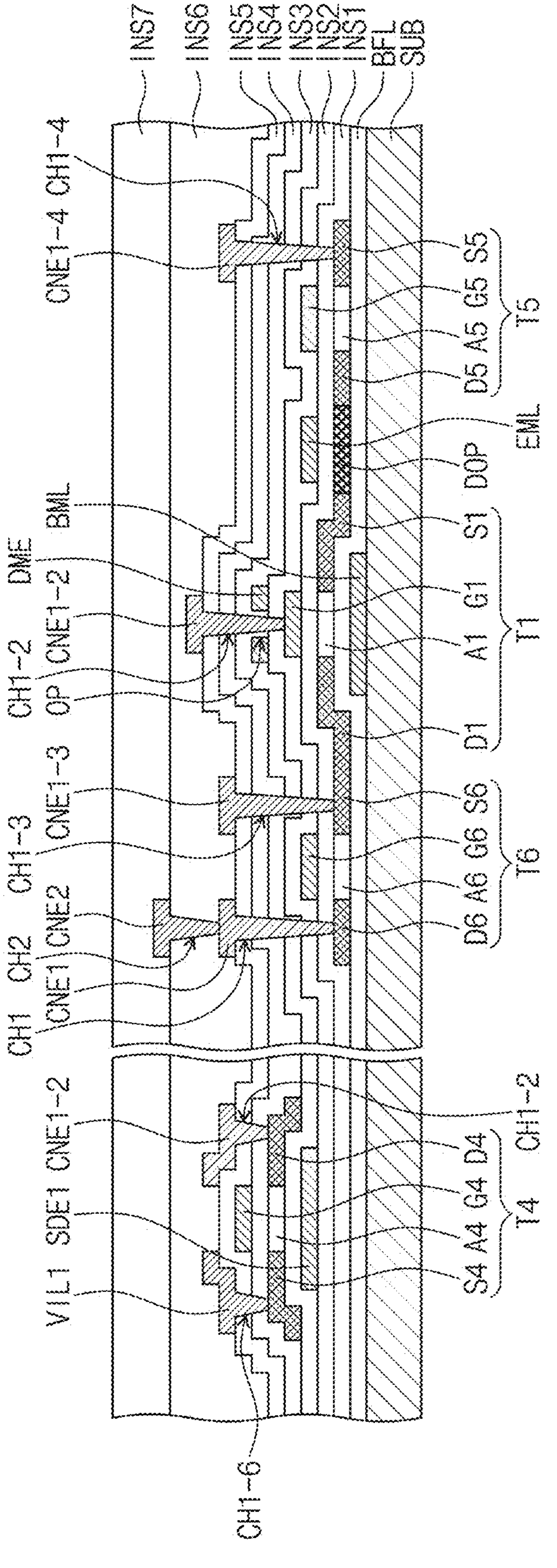
FIG. 13 is a view illustrating a cross-sectional configuration of a first transistor, a fourth transistor, a fifth transistor, and a sixth transistor described with reference to layout diagrams in FIGS.

FIG. 13 is a view illustrating a cross-sectional configuration of the first transistor, the fourth transistor, the fifth transistor, and the sixth transistor described with reference to the layout diagrams in FIGS. 8A to 8H.

Referring to FIG. 13, a first initialization line VIL1 may be disposed on a fifth insulating layer INS5. The first initialization line VIL1 may be disposed above a fourth transistor T4. A first dummy electrode SDE1 may be disposed on a second insulating layer INS2, and a third insulating layer INS3 may be disposed on the first dummy electrode SDE1. Thus, the first dummy electrode SDE1 may be disposed below fourth semiconductor layers S4, A4 and D4 of the fourth transistor T4. As an example, the first dummy electrode SDE1 is omitted in FIG. 7.

A first contact hole CH1-6 may be defined in fourth and fifth insulating layers INS4 and INS5 disposed between the first initialization line VIL1 and the fourth semiconductor layers S4, A4 and D4. The first initialization line VIL1 may be connected to a fourth source region S4 of the fourth semiconductor layers S4, A4 and D4 through the first contact hole CH1-6. The first initialization line VIL1 may be connected to the fourth semiconductor layers S4, A4 and D4 through the first contact hole CH1-6 that is a single contact hole, not through a plurality of contact holes.

A first connection electrode CNE1-2 may be disposed on the fifth insulating layer INS5, and connected to a fourth drain region D4 of the fourth semiconductor layers S4, A4 and D4 of the fourth transistor T4 through a first contact hole CH1-2 defined in the fourth and fifth insulating layers INS4 and INS5.

First and second connection electrodes CNE1 and CNE2 may be connected to the sixth transistor T6 through first and second contact holes CH1 and CH2 defined in the first to sixth insulating layers INS1 to INS6. A first connection electrode CNE1-3 may be connected to a sixth drain region D6 of sixth semiconductor layers S6, A6 and D6 of the sixth transistor T6 through a first contact hole CH1-3 defined in the first to fifth insulating layers INS1 to INS5.

A first connection electrode CNE1-2 may be connected to a first gate electrode G1 of a first transistor T1 through a first contact hole CH1-2 defined in the second to fifth insulating layers INS2 to INS5. The first connection electrode CNE1-2 may be connected to the first gate electrode G1 through an opening portion OP of a dummy electrode DME disposed on the first gate electrode G1.

An emission line EML may be disposed on a first insulating layer INS1. A doped region DOP may overlap the emission line EML. The doped region DOP may be disposed between a first source region S1 and a fifth drain region D5. The doped region DOP, the first source region S1, and the fifth drain region D5 may be heavily doped to have high conductivities, and thus function like a conductive layer.

A first connection electrode CNE1-4 may be connected to a fifth source region D4 of fifth semiconductor layers S5, A5 and D4 of a fifth transistor T5 through a first contact hole CH1-4 defined in the first to fifth insulating layers INS1 to INS5. The emission line EML may be disposed on the same layer as a fifth gate electrode G5 of the fifth transistor T5.

Although not illustrated, a first connection electrode CNE1-4' may be connected to a first power line PL1 through a second contact hole CH2-3 defined in the sixth insulating layer INS6.

A seventh transistor T7 may be disposed on the same layer as a sixth transistor T6, and a second initialization line VIL2 may be disposed on the same layer as the first initialization line VIL1. Thus, although not illustrated, the second initialization line VIL2 may be connected to seventh semiconductor layers S7, A7 and D7 of the seventh transistor T7 through a first contact hole CH1-7 defined in the first to fifth insulating layers INS1 to INS5 between the seventh semiconductor layers S7, A7 and D7 of the seventh transistor T7 and the second initialization line VIL2.

Figure 14:
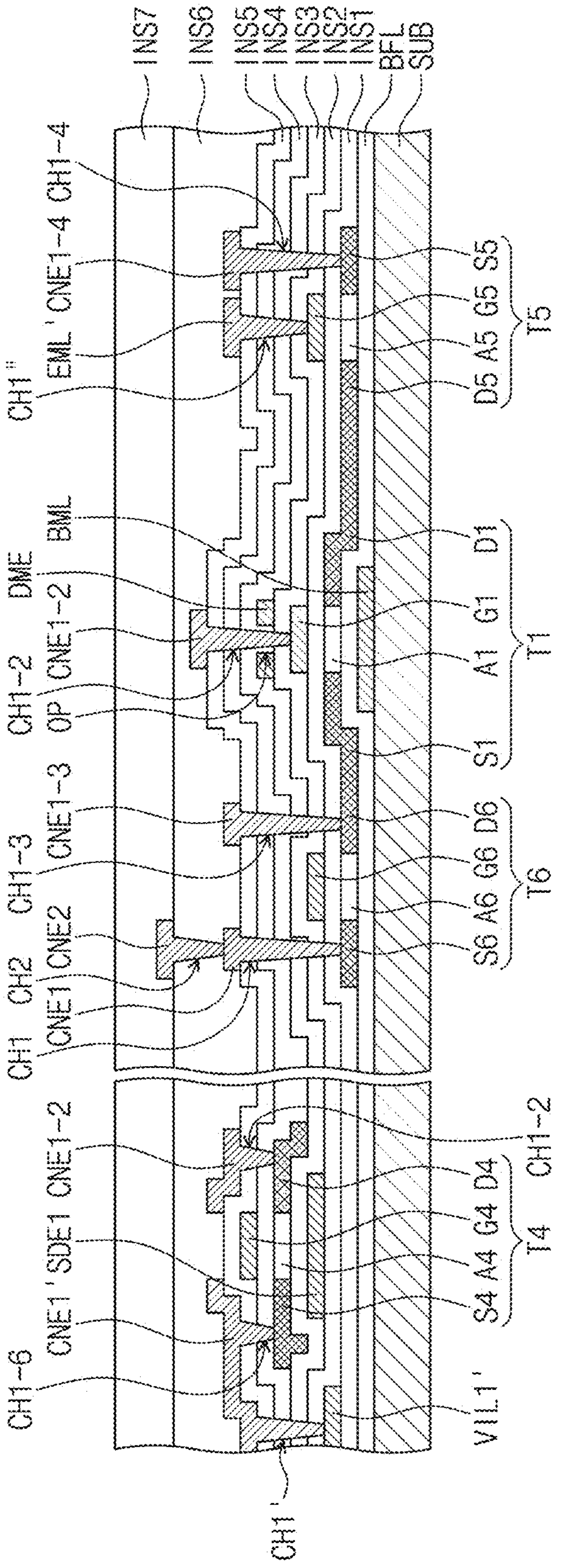
FIG. 14 is a view illustrating a cross-sectional configuration of transistors according to a comparative example.

FIG. 14 is a view illustrating a cross-sectional configuration of transistors according to a comparative example.

As an example, FIG. 14 illustrates a cross-section corresponding to FIG. 13. Hereinafter, components illustrated in FIG. 14 will be described mainly in terms of different components from the components illustrated in FIG. 13.

Referring to FIG. 14, a first initialization line VIL1' may be disposed on a first insulating layer INS1. In this case, a separate first connection electrode CNE1' for connecting the first initialization line VIL1' to a fourth transistor T4 may be used.

The first connection electrode CNE1' may be disposed on a fifth insulating layer INS5, and be connected to the first initialization line VIL1' through a first contact hole CH1' defined in second to fifth insulating layers INS2 to INS5. In addition, the first connection electrode CNE1' may be connected to fourth semiconductor layers S4, A4 and D4 through a first contact hole CH1-6 defined in the fourth and fifth insulating layers INS4 and INS5. Thus, the first initialization line VIL1' may be connected to the fourth semiconductor layers S4, A4 and D4 through the first connection electrode CNE1'.

In order to connect the first initialization line VIL1' to the fourth semiconductor layers S4, A4 and D4 through the first connection electrode CNE1', the two contact holes CH1' and CH1-6 may be used. However, as illustrated in FIG. 13, when the first initialization line VIL1 is disposed on the fifth insulating layer INS5, the first initialization line VIL1 may be connected to the fourth semiconductor layers S4, A4 and D4 through the single first contact hole CH1-6.

An emission line EML' may be disposed on the fifth insulating layer INS5. In this case, the emission line EML' may be connected to a fifth gate electrode G5 of a fifth transistor T5 through a first contact hole CH1" defined in the second to fifth insulating layers INS2 to INS5. However, in the case in which the emission line EML is disposed on the first insulating layer INS1 as illustrated in FIG. 13, the first contact hole CH1" illustrated in FIG. 14 may be omitted.

As described above, seventh transistors T7 of two pixel circuits may be connected, in common, to a second initialization line VIL2 through a single contact hole CH1-7, not through two contact holes. In addition, the first initialization line VIL1 may be connected to the fourth semiconductor layers S4, A4 and D4 through the single contact hole CH1-6, and a separate contact hole for connecting the emission line EML to the fifth gate electrode G5 may not be required. Thus, in an embodiment of the inventive concept, the number of the contact holes may be decreased.

When the number of the contact holes is increased, an area required to form a pixel circuit PC including transistors T1 to T8 may be expanded. In this case, high resolution of the display device DD may be difficult to achieve.

In an embodiment of the inventive concept, as the number of the contact holes is decreased, the area required to form the pixel circuit PC including the transistors T1 to T8 may be reduced. As the area required to form the pixel circuit PC is reduced, the number of pixels PX in a unit area may be increased to easily achieve the display device DD having high resolution.

Figure 15:
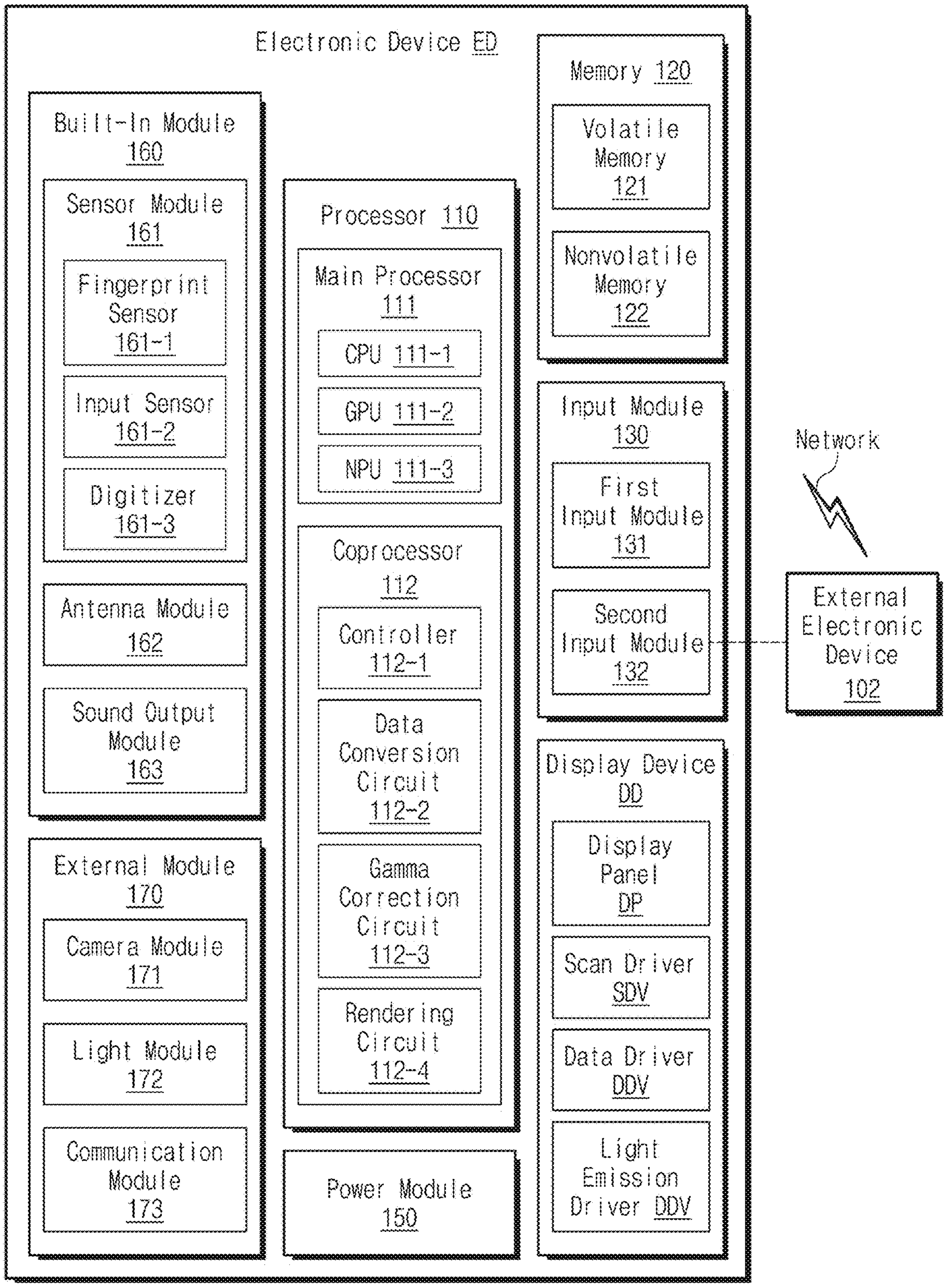
FIG. 15 is a block diagram of an electronic device according to embodiments of the inventive concept.

FIG. 15 is a block diagram of an electronic device including a display device according to an embodiment of the inventive concept.

Referring to FIG. 15, an electronic device ED may output various information through a display device DD in an operating system. When a processor 110 executes an application stored in a memory 120, the display device DD may provide application information for a user through a display panel DP.

The processor 110 obtains an external input through an input module 130 or a sensor module 161, and executes an application corresponding to the external input. For example, when the user selects a camera icon displayed on the display panel DP, the processor 110 obtains a user input through an input sensor 161-2 and activates a camera module 171. The processor 110 transmits, to the display device DD, image data corresponding to a photographing image obtained through the camera module 171. The display device DD may display an image corresponding to the photographing image through the display panel DP.

As another example, when individual information authentication is performed in the display device DD, a fingerprint sensor 161-1 obtains fingerprint information input as input data. The processor 110 compares the input data obtained through the fingerprint sensor 161-1 with authentication data stored in the memory 120, and executes an application according to a result of the comparison. The display device DD may display, through the display panel DP, information executed according to a logic of the application.

An another example, when a music streaming icon displayed on the display device DD is selected, the processor 110 obtains a user input through the input sensor 161-2 and activates a music streaming application stored in the memory 120. When a music play command is input to the music streaming application, the processor 110 activates a sound output module 163 and provides the user with sound information corresponding to the music play command.

The operations of the electronic device ED are briefly described as above. Hereinafter, components of the electronic device ED will be described in detail. Among the components of the electronic device ED to be described later, some components may be integrally provided as one component, and one component may be divided into two or more components.

The electronic device ED may communicate with an external electronic device 102 over a network (e.g., a short-range wireless communication network or a long-range wireless communication network). According to an embodiment, the electronic device ED may include the processor 110, the memory 120, the input module 130, the display device DD, a power module 150, a built-in module 160, and an external module 170. According to an embodiment, in the electronic device ED, at least one of the foregoing components may be omitted, or one or more other components may be added. According to an embodiment, some components (e.g., the sensor module 161, an antenna module 162, or the sound output module 163) of the foregoing components may be integrated into another component (e.g., the display device DD).

The processor 110 may execute software to control at least one other component (e.g., a hardware or software component) of the electronic device ED connected to the processor 110, and may perform various data processing or computation. According to an embodiment, as at least a part of the data processing or computation, the processor 110 may store a command or data received from other component (e.g., the input module 130, the sensor module 161, or a communication module 173) in a volatile memory 121, process the command or data stored in the volatile memory 121, and store the resulting data in a nonvolatile memory 122.

The processor 110 may include a main processor 111 and a coprocessor 112. The main processor 111 may include at least one of a central processing unit (CPU) 111-1 or an application processor (AP). The main processor 111 may also include at least one of a graphic processing unit (GPU) 111-2, a communication processor (CP), or an image signal processor (ISP).

The main processor 111 may further include a neural processing unit (NPU) 111-3. The neural processing unit 111-3 may be a processor specialized for processing of an artificial intelligence model, and the artificial intelligence model may be created through machine learning. The artificial intelligence model may include a plurality of artificial neural network layers.

The artificial neural network may include one of deep neural network (DNN), convolutional neural network (CNN), recurrent neural network (RNN), restricted boltzmann machine (RBM), deep belief network (DBN), bidirectional recurrent deep neural network (BRDNN), deep Q-networks, or a combination of two or more of the foregoing networks, but is not limited to the foregoing examples.

Additionally or alternatively, the artificial intelligence model may include a software structure in addition to a hardware structure. At least two of the foregoing processing units and processors may be implemented as one integrated component (e.g., a single chip), or the foregoing processing units and processors may be implemented as independent components (e.g., a plurality of chips).

The coprocessor 112 may include a controller 112-1. The controller 112-1 may include an interface conversion circuit and a timing control circuit. The controller 112-1 receives an image signal from the main processor 111 and outputs image data obtained by converting a data format of the image signal so as to be suitable for the specification of an interface with the display device DD. The controller 112-1 may output various control signals necessary to drive the display device DD.

The coprocessor 112 may further include a data conversion circuit 112-2, a gamma correction circuit 112-3, a rendering circuit 112-4, or the like. The data conversion circuit 112-2 may receive image data from the controller 112-1, and compensate for the image data such that an image is displayed with a desired luminance according to a characteristic of the electronic device ED or user settings, or convert the image data to reduce power consumption or compensate for image-sticking.

The gamma correction circuit 112-3 may convert image data, a gamma reference voltage, or the like such that an image displayed on the electronic device ED1 has a desired gamma characteristic.

The rendering circuit 112-4 may receive the image data from the controller 112-1, and render the image data in consideration of a pixel arrangement of the display panel DP applied to the electronic device ED.

At least one of the data conversion circuit 112-2, the gamma correction circuit 112-3, or the rendering circuit 112-4 may be integrated into other component (e.g., the main processor 111 or the controller 112-1). At least one of the data conversion circuit 112-2, the gamma correction circuit 112-3, or the rendering circuit 112-4 may be integrated into a data driver DDV to be described later.

The memory 120 may store various data used by at least one component (e.g., the processor 110 or the sensor module 161) of the electronic device ED, and input data or output data for relevant commands. The memory 120 may include at least one of the volatile memory 121 or the nonvolatile memory 122.

The input module 130 may receive a command or data to be used in a component (e.g., the processor 110, the sensor module 161, or the sound output module 163) of the electronic device ED from the outside of the electronic device ED (e.g., the user or the external electronic device 102).

The input module 130 may include a first input module 131 to which a command or data is input from the user, and a second input module 132 to which a command or data is input from the external electronic device 102. The first input module 131 may include a microphone, a mouse, a keyboard, a key (e.g., a button), or a pen (e.g., a passive pen or an active pen).

The second input module 132 may support a designated protocol capable of connecting to the external electronic device 102 in a wired or wireless manner. According to an embodiment, the second input module 132 may include a high definition multimedia interface (HDMI), a universal serial bus (USB) interface, a secure digital (SD) card interface, or an audio interface. The second input module 132 may include a connector capable of being physically connected to the external electronic device 102, for example, an HDMI connector, a USB connector, an SD card connector, or an audio connector (e.g., a headphone connector).

The display device DD visually provides information for the user. As described with reference to FIG. 4, the display device DD may include the display panel DP, a scan driver SDV, a light emission driver EDV, and the data driver DDV. The display device DD may further include a window, a chassis, and a bracket for protecting the display panel DP.

The display panel DP may include a liquid crystal display panel, an organic light emitting display panel, or an inorganic light emitting display panel, and the type of the display panel DP is not particularly limited. The display panel DP may be a rigid type, or a flexible type capable of being rolled and/or folded. The display device DD may further include a supporter which supports the display panel DP, a bracket, a heat dissipation member, or the like.

The display device DD may further include a voltage generation circuit. The voltage generation circuit may output various voltages necessary to drive the display panel DP.

The power module 150 supplies power to the components of the electronic device ED. The power module 150 may include a battery which charges a power voltage. The battery may include a non-rechargeable primary battery, a rechargeable secondary battery, or a fuel battery. The power module 150 may include a power management integrated circuit (PMIC). The PMIC supplies optimized power to each of the display device DD and modules. The power module 150 may include a wireless power transmission/reception member electrically connected to the battery. The wireless power transmission/reception member may include a plurality of antenna radiators in the form of coils.

The electronic device ED may further include the built-in module 160 and the external module 170. The built-in module 160 may include the sensor module 161, the antenna module 162, and the sound output module 163. The external module 170 may include the camera module 171, a light module 172, and the communication module 173.

The sensor module 161 may detect an input by the user's body or an input by a pen of the first input module 131, and generate an electrical signal or data value corresponding to the input. The sensor module 161 may include at least one of the fingerprint sensor 161-1, the input sensor 161-2, or a digitizer 161-3.

The fingerprint sensor 161-1 may generate a data value corresponding to the user's fingerprint. The fingerprint sensor 161-1 may include one of an optical or capacitance fingerprint sensor.

The input sensor 161-2 may generate a data value corresponding to coordinate information of an input by the user's body or an input by a pen. The input sensor 161-2 generates a capacitance change due to the input as a data value. The input sensor 161-2 may detect an input by the passive pen or transmit/receive data to/from the active pen.

The input sensor 161-2 may measure a bio-signal such as blood pressure, moisture, or body fat. For example, when the user touches part of the body to a sensor layer or a sensing panel and does not move for a certain period of time, the input sensor 161-2 may detect a bio-signal to output information desired by the user to the display device DD based on a change in an electric field caused by the part of the body.

The digitizer 161-3 may generate a data value corresponding to coordinate information of an input by the pen. The digitizer 161-3 generates an electromagnetic change by the input as a data value. The digitizer 161-3 may detect an input by the passive pen or transmit/receive data to/from the active pen.

At least one of the fingerprint sensor 161-1, the input sensor 161-2, or the digitizer 161-3 may be implemented as a sensor layer formed on the display panel DP through a continuous process. The fingerprint sensor 161-1, the input sensor 161-2, and the digitizer 161-3 may be disposed above the display panel DP, and any one of the fingerprint sensor 161-1, the input sensor 161-2, and the digitizer 161-3, for example, the digitizer 161-3, may be disposed below the display panel DP.

At least two of the fingerprint sensor 161-1, the input sensor 161-2, and the digitizer 161-3 may be integrated into one sensing panel through the same process. When the at least two are integrated into the one sensing panel, the sensing panel may be disposed between the display panel DP and a window disposed above the display panel DP. According to an embodiment, the sensing panel may be disposed on the window, and a position of the sensing panel is not particularly limited.

At least one of the fingerprint sensor 161-1, the input sensor 161-2, or the digitizer 161-3 may be embedded in the display panel DP. That is, at least one of the fingerprint sensor 161-1, the input sensor 161-2, or the digitizer 161-3 may be formed simultaneously through a process of forming elements (e.g., light emitting elements, transistors, or the like) included in the display panel DP.

In addition, the sensor module 161 may generate an electrical signal or data value corresponding to an internal state or external state of the electronic device ED. The sensor module 161 may further include, for example, a gesture sensor, a gyro sensor, a barometric pressure sensor, a magnetic sensor, an acceleration sensor, a grip sensor, a proximity sensor, a color sensor, an IR (infrared) sensor, a biosensor, a temperature sensor, a humidity sensor, or an illuminance sensor.

The antenna module 162 may include one or more antennas for transmitting a signal or power to the outside or receiving a signal or power from the outside. According to an embodiment, the communication module 173 may transmit a signal to an external electronic device or receive a signal from the external electronic device through an antenna suitable for a communication method. An antenna pattern of the antenna module 162 may be integrated into one component (e.g., the display panel DP) of the display device DD, the input sensor 161-2, or the like.

The sound output module 163 may be a device for outputting a sound signal to the outside of the electronic device ED, and include, for example, a speaker used for general purposes such as multimedia playback or recording playback and a receiver used exclusively for receiving calls. According to an embodiment, the receiver may be formed integrally with or separately from the speaker. A sound output pattern of the sound output module 163 may be integrated into the display device DD.

The camera module 171 may photograph still images and moving images. According to an embodiment, the camera module 171 may include one or more lenses, image sensors, or image signal processors. The camera module 171 may further include an infrared camera capable of measuring the presence/absence of a user, the user's position, the user's gaze, or the like.

The light module 172 may provide light. The light module 172 may include a light emitting diode or a xenon lamp. The light module 172 may operate in conjunction with the camera module 171 or operate independently.

The communication module 173 may establish a wired or wireless communication channel between the electronic device ED and the external electronic device 102, and support communication through the established communication channel. The communication module 173 may include one or all of a wireless communication module such as a cellular communication module, a short-range wireless communication module, or a global navigation satellite system (GNSS) communication module, and a wired communication module such as a local area network (LAN) communication module or a power line communication module.

The communication module 173 may communicate with the external electronic device 102 through a short-range communication network such as Bluetooth, WiFi direct, or infrared data association (IrDA), or a long-range communication network such as a cellular network, an Internet, or a computer network (e.g., LAN or WAN). The various types of communication modules 173 described above may be implemented as a single chip, or implemented as separate chips, respectively.

The input module 130, the sensor module 161, the camera module 171, and the like may be utilized to control the operation of the display device DD in conjunction with the processor 110.

The processor 110 outputs a command or data to the display device DD, the sound output module 163, the camera module 171, or the light module 172 based on input data received from the input module 130. For example, the processor 110 may generate image data in response to the input data input through a mouse, an active pen, or the like, and output the image data to the display device DD, or may generate command data in response to the input data and output the command data to the camera module 171 or the light module 172.

When the input data is not received from the input module 130 for a certain period of time, the processor 110 may convert an operation mode of the electronic device ED into a low power mode or a sleep mode, thereby reducing power consumed by the electronic device ED.

The processor 110 outputs a command or data to the display device DD, the sound output module 163, the camera module 171, or the light module 172 based on sensing data received from the sensor module 161. For example, the processor 110 may compare authentication data input by the fingerprint sensor 161-1 with authentication data stored in the memory 120 and then execute an application according to a result of the comparison.

The processor 110 may execute a command based on sensing data sensed by the input sensor 161-2 or the digitizer 161-3, or output corresponding image data to the display device DD. When the sensor module 161 includes a temperature sensor, the processor 110 may receive temperature data for temperatures measured from the sensor module 161 and further perform a luminance correction, or the like on the image data based on the temperature data.

The processor 110 may receive measurement data about the presence/absence of a user, the position of the user, the user's gaze, or the like from the camera module 171. The processor 110 may further perform the luminance correction or the like on the image data based on the measurement data. For example, the processor 110 having determined the presence/absence of a user through an input from the camera module 171 may output, to the display device DD, image data in which the luminance is corrected through the data conversion circuit 112-2 or the gamma correction circuit 112-3.

Some of the foregoing components may be connected to each other through a communication method between peripheral devices, for example, a bus, a general purpose input/output (GPIO), a serial peripheral interface (SPI), a mobile industry processor interface (MIPI), or an ultra path interconnect (UPI) link, and exchange signals (e.g., commands or data) with each other. The processor 110 may communicate with the display device DD through an appointed interface. For example, any one of the foregoing communication methods may be used, and the communication method is not limited to the foregoing communication methods.

The electronic device ED according to various embodiments described herein may be various types of devices. The electronic device ED may include, for example, at least one of a portable communication device (e.g., a smartphone), a computer device, a portable multimedia device, a portable medical device, a camera, a wearable device, or a home appliance. The electronic device ED according to an embodiment herein is not limited to the foregoing devices.

According to the embodiment of the inventive concept, the first initialization line may be disposed above the fourth transistor and connected to the fourth semiconductor layer of the fourth transistor through the single contact hole, and the seventh transistors of the two pixels adjacent to each other may be connected to the second initialization line through the single contact hole. As the single contact hole is used for each of the first and second initialization lines, the number of the contact holes may be decreased.

Moreover, the emission line may not be disposed on the control electrode of the fifth transistor but be disposed on the same layer as the control electrode of the fifth transistor to provide the control electrode of the fifth transistor, and thus the separate contact hole may not be used. Therefore, the number of the contact holes may be decreased.

As the number of the contact holes is decreased, the area required to form the pixel circuit including the transistors may be reduced. As the area required to form the pixel circuit is reduced, the number of the pixels disposed in a unit area may be increased to easily achieve the display device having the high resolution.

Although the embodiments of the present inventive concept have been described, it is understood that the present inventive concept should not be limited to these embodiments but various changes and modifications can be made by one ordinary skilled in the art within the spirit and scope of the present inventive concept as hereinafter claimed. Rather, these embodiments set forth herein are provided so that this disclosure will be thorough and complete, and will fully convey the scope of the inventive concept to those skilled in the art.

What is claimed is:

1. A display device comprising:
- a light emitting element;
- a first transistor comprising a first electrode, a second electrode connected to an anode of the light emitting element, and a control electrode connected to a first node;
- a second transistor comprising a first electrode connected to a data line, a second electrode connected to the first electrode of the first transistor, and a control electrode connected to a write scan line;
- a fifth transistor comprising a first electrode connected to a first power line, a second electrode connected to the first electrode of the first transistor, and a control electrode connected to an emission line; and
- a doped region comprising a semiconductor doped with a dopant to be highly conductive, disposed below a portion of the emission line, and overlapping the emission line in a plan view.

2. The display device of claim 1, wherein the doped region is disposed between a first semiconductor layer of the first transistor and a fifth semiconductor layer of the fifth transistor.

3. The display device of claim 2, wherein the doped region extends from the first semiconductor layer to the fifth semiconductor layer and is formed integrally with the first and fifth semiconductor layers.

4. The display device of claim 2, wherein the doped region has a higher conductivity than a first channel region of the first semiconductor layer.

5. The display device of claim 4, wherein a first source region and a first drain region of the first semiconductor layer correspond to the first electrode and the second electrode of the first transistor, respectively, and
- wherein a doping concentration of the doped region is different from a doping concentration of each of the first source region and the first drain region.

6. The display device of claim 5, wherein the doped region is doped before the first source region and the first drain region is doped.

7. The display device of claim 1, wherein the doped region is doped with a p-type dopant.

8. The display device of claim 1, wherein the emission line is disposed on the same layer as the control electrode of the fifth transistor.

9. The display device of claim 8, wherein the control electrode of the fifth transistor is formed at the same time with the emission line.

10. The display device of claim 1, further comprising:

a third transistor comprising a first electrode connected to the second electrode of the first transistor, a second electrode connected to the first node, and a control electrode connected to a compensation scan line; and a fourth transistor comprising a first electrode connected to the first node, a second electrode connected to a first initialization line, and a control electrode connected to an initialization scan line.

11. The display device of claim 10, wherein the first initialization line is disposed above the fourth transistor.

12. The display device of claim 11, wherein a fourth source region and a fourth drain region of a fourth semiconductor layer of the fourth transistor correspond to the second electrode and the first electrode of the fourth transistor, respectively, and wherein the first initialization line is connected to the fourth semiconductor layer through a single contact hole defined in insulating layers disposed between the first initialization line and the fourth semiconductor layer.

13. The display device of claim 10, wherein a third semiconductor layer of the third transistor and a fourth semiconductor layer of the fourth transistor are formed integrally and extend in a first direction, wherein the compensation scan line and the initialization scan line extend in a second direction crossing the first direction and are arranged in the first direction, and wherein the compensation scan line extends to intersect the third semiconductor layer, and the initialization scan line extends to intersect the fourth semiconductor layer.

14. The display device of claim 13, wherein a length of each of a third channel region of the third semiconductor layer which overlaps the compensation scan line and a fourth channel region of the fourth semiconductor layer which overlaps the initialization scan line in the first direction is set to be about 3.5 micrometers.

15. The display device of claim 14, wherein a width of each of the third channel region and the fourth channel region in the second direction is set to be about 3.0 micrometers.

16. The display device of claim 13, further comprising:

a sixth transistor comprising a first electrode connected to the second electrode of the first transistor, a second electrode connected to the anode of the light emitting element, and a control electrode connected to the emission line; and a seventh transistor comprising a first electrode connected to the anode of the light emitting element, a second electrode connected to a second initialization line, and a control electrode connected to a bias scan line.

17. The display device of claim 16, further comprising a first pixel circuit and a second pixel circuit, each of which comprises the first to seventh transistors and the light emitting element, and which are adjacent to each other in the second direction, wherein, in the second direction, a gap between third and fourth semiconductor layers of the first pixel circuit, and third and fourth semiconductor layers of the second pixel circuit is set to be about 2.5 micrometers to about 3.5 micrometers.

18. The display device of claim 17, wherein the seventh transistors of the first and second pixel circuits are connected to the second initialization line through a single contact hole, and wherein the single contact hole is defined in insulating layers between seventh semiconductor layers of the seventh transistors and the second initialization line.

19. A display device comprising: a light emitting element; a first transistor comprising a first electrode, a second electrode connected to an anode of the light emitting element, and a control electrode connected to a first node; a second transistor comprising a first electrode connected to a data line, a second electrode connected to the first electrode of the first transistor, and a control electrode connected to a write scan line; a fifth transistor comprising a first electrode connected to a first power line, a second electrode connected to the first electrode of the first transistor, and a control electrode connected to an emission line; and a doped region comprising a semiconductor doped with a dopant to be highly conductive, disposed below a portion of the emission line, and overlapping the emission line in a plan view, wherein the emission line is disposed on the same layer as the control electrode of the fifth transistor.

20. An electronic device comprising: a processor; and a display device receiving image data from the processor and configured to display an image corresponding to the image data, wherein the display device comprises: a light emitting element; a first transistor comprising a first electrode, a second electrode connected to an anode of the light emitting element, and a control electrode connected to a first node; a second transistor comprising a first electrode connected to a data line, a second electrode connected to the first electrode of the first transistor, and a control electrode connected to a write scan line; a fifth transistor comprising a first electrode connected to a first power line, a second electrode connected to the first electrode of the first transistor, and a control electrode connected to an emission line; and a doped region comprising a semiconductor doped with a dopant to be highly conductive, disposed below a portion of the emission line, and overlapping the emission line in a plan view.

* * * * *